US009733981B2

(12) United States Patent
Jokinen et al.

(10) Patent No.: US 9,733,981 B2
(45) Date of Patent: Aug. 15, 2017

(54) SYSTEM AND METHOD FOR CONDITIONAL TASK SWITCHING DURING ORDERING SCOPE TRANSITIONS

(71) Applicants: Tommi M. Jokinen, Austin, TX (US); Michael Kardonik, Austin, TX (US); David B. Kramer, Cedar Park, TX (US); Peter W. Newton, Austin, TX (US); John F. Pillar, Ottawa (CA); Kun Xu, Austin, TX (US)

(72) Inventors: Tommi M. Jokinen, Austin, TX (US); Michael Kardonik, Austin, TX (US); David B. Kramer, Cedar Park, TX (US); Peter W. Newton, Austin, TX (US); John F. Pillar, Ottawa (CA); Kun Xu, Austin, TX (US)

(73) Assignee: NXP USA, Inc., Austin, TX (US)

( * ) Notice: Subject to any disclaimer, the term of this patent is extended or adjusted under 35 U.S.C. 154(b) by 566 days.

(21) Appl. No.: 14/300,762

(22) Filed: Jun. 10, 2014

(65) Prior Publication Data

US 2015/0355938 A1 Dec. 10, 2015

(51) Int. Cl.
*G06F 9/48* (2006.01)
*G06F 9/46* (2006.01)

(52) U.S. Cl.
CPC ...... *G06F 9/4881* (2013.01); *G06F 2209/484* (2013.01)

(58) Field of Classification Search
None
See application file for complete search history.

(56) References Cited

U.S. PATENT DOCUMENTS

| | | | |
|---|---|---|---|
| 6,148,299 A | 11/2000 | Yoshimoto | |
| 6,263,358 B1 | 7/2001 | Lee | |
| 6,430,594 B1 | 8/2002 | Akiyama | |
| 6,470,376 B1 | 10/2002 | Tanaka | |
| 6,721,309 B1 | 4/2004 | Stone et al. | |
| 7,594,234 B1 | 9/2009 | Dice | |
| 7,770,172 B2 | 8/2010 | Clift | |
| 7,895,431 B2 | 2/2011 | Bouchard et al. | |
| 8,015,567 B2 | 9/2011 | Hass | |
| 8,189,591 B2 | 5/2012 | Blaker et al. | |
| 8,190,807 B2 * | 5/2012 | Reid | G06F 11/362 711/3 |
| 8,381,218 B2 | 2/2013 | Periorellis et al. | |
| 2002/0194328 A1 | 12/2002 | Hallenbeck | |

(Continued)

OTHER PUBLICATIONS

U.S. Appl. No. 14/231,784, filed Apr. 1, 2014, entitled "System and Method for Conditional Task Switching During Ordering Scope Transitions".

(Continued)

*Primary Examiner* — Eric C Wai

(57) ABSTRACT

A data processing system includes a processor core and a hardware module. The processor core performs tasks on data packets. The ordering scope manager stores a first value in a first storage location. The first value indicates that exclusive execution of a first task in a first ordering scope is enabled. In response to a relinquish indicator being received, the ordering scope manager stores a second value in the first storage location. The second value indicates that the exclusively execution of the first task in the first ordering scope is disabled.

17 Claims, 9 Drawing Sheets

(56) References Cited

U.S. PATENT DOCUMENTS

| | | |
|---|---|---|
| 2005/0055504 A1 | 3/2005 | Hass |
| 2006/0085793 A1 | 4/2006 | McKenney |
| 2008/0062927 A1 | 3/2008 | Zhu |
| 2009/0172675 A1 | 7/2009 | Grossman |
| 2010/0262976 A1 | 10/2010 | Maruyama |
| 2010/0287360 A1 | 11/2010 | Maruyama |
| 2011/0083000 A1 | 4/2011 | Rhoades et al. |
| 2011/0093660 A1 | 4/2011 | Pelley, III et al. |
| 2012/0008631 A1 | 1/2012 | Hass |
| 2012/0137298 A1 | 5/2012 | Periorellis et al. |
| 2012/0272247 A1 | 10/2012 | Scott |
| 2013/0128896 A1 | 5/2013 | Munoz |
| 2015/0277972 A1 | 10/2015 | Xu |
| 2015/0277973 A1 | 10/2015 | Xu |

OTHER PUBLICATIONS

U.S. Appl. No. 14/231,789, filed Apr. 1, 2014, entitled "System and Method for Conditional Task Switching During Ordering Scope Transitions".

Non-Final Office Action mailed Oct. 1, 2015 for U.S. Appl. No. 14/231,784, 11 pages.

Non-Final Office Action mailed Sep. 3, 2015 for U.S. Appl. No. 14/231,789, 16 pages.

Notice of Allowance mailed Apr. 11, 2016 for U.S. Appl. No. 14/231,784, 8 pages.

Notice of Allowance mailed Feb. 19, 2016 for U.S. Appl. No. 14/231,789, 8 pages.

\* cited by examiner

SYSTEM AND METHOD FOR CONDITIONAL TASK SWITCHING DURING ORDERING SCOPE TRANSITIONS

CROSS-REFERENCE TO RELATED APPLICATION(S)

The present application is related to co-pending U.S. patent application Ser. No. 14/231,784, entitled "SYSTEM AND METHOD FOR CONDITIONAL TASK SWITCHING DURING ORDERING SCOPE TRANSITIONS" filed on Apr. 1, 2014, and co-pending U.S. patent application Ser. No. 14/231,789, entitled "SYSTEM AND METHOD FOR CONDITIONAL TASK SWITCHING DURING ORDERING SCOPE TRANSITIONS" filed on Apr. 1, 2014, the entirety of which are herein incorporated by reference.

FIELD OF THE DISCLOSURE

This disclosure generally relates to data processing, and more particularly to a system and method for task switching.

BACKGROUND

Multi-core processing systems often perform operations on packet data. The packet data is associated with a program identifier (program ID) that indicates a particular program to be executed by a core to process the packet data. A task manager or work scheduler can assign a particular core to execute the program to process the packet data. This combination of a program and corresponding packet data represents a specific task that is to be executed by the processing system, and in particular, once assigned to the core, this combination represents a specific task of the core. Each core can be assigned multiple tasks.

A task may be divided into one or more portions that are referred to as ordering scopes. When a task has multiple ordering scopes, each ordering scope generally represents an operation to be performed by the task without being interrupted by a task switch. For example, an ordering scope can correspond to a portion of the task's program code that is executed by the core between task switch instructions. An ordering scope can also correspond to an operation to be performed by a non-core resource. For example, an ordering scope can correspond to an operation for which control has been transferred from the core to the non-core resource, such as to a hardware accelerator, to execute on the packet data. Note that when an ordering scope is being executed by a non-core resource, the core assigned to process the ordering scope may not be actively processing that ordering scope. In such case, the core can be used to execute another ordering scope of the task, or to execute another task. When the ordering scope associated with the non-core resource is finished executing on the packet data, the core can resume executing on the original ordering scope, or on a next ordering scope.

A processor core can switch between tasks on ordering scope boundaries (e.g., after completion of one ordering scope and before starting a next ordering scope). However, when switching between tasks, the processor core is typically able to store context information (e.g., state information) for its current task before exiting the current task. The process of saving a particular core's context information for an executing task, and loading stored context information associated with a next task to be processed by the core, is generally referred to as context/task switching. Task switching provides the benefit of enabling a processor core to execute multiple tasks in a time-sliced manner. One cost of task switching is that there is some delay in switching between tasks due to the saving of current context information and the loading of stored context information for the next task. This cost is especially high in systems where a full context switch occurs for each context switch instruction (e.g., at every ordering scope boundary) with no regard as to the next task.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
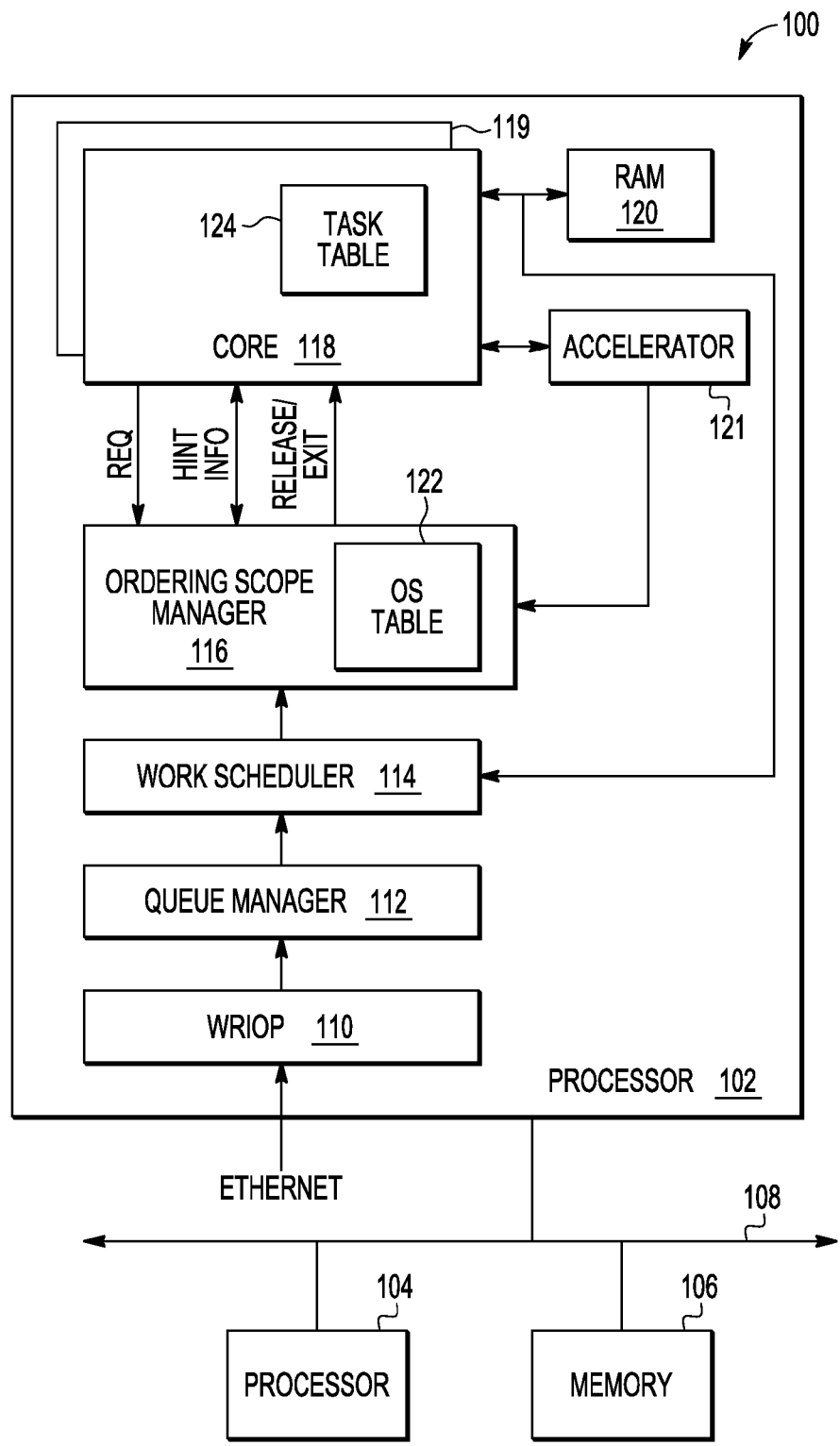
FIG. 1 illustrates a data processing system in accordance with at least one embodiment of the present disclosure.

A data processing system is disclosed that has a work scheduler, an ordering scope manager, and multiple processor cores. For each received data packet, the work scheduler of the data processing system determines a program identifier (program ID) of a program that is to process the packet data, and an ordering scope identifier that identifies the initial ordering scope of that program, which also corresponds to the start of the program. The work scheduler further assigns a unique task identifier (task ID) that corresponds to the received data packet and to the program that is to process the data payload of the data packet (the packet data). Thus, the task ID identifies a task that executes a particular instantiation of a program to process a particular packet. Typically, tasks associated with different packets of the same data stream will have the same ordering scopes by virtue of executing different instantiations of the same program. The work scheduler further assigns each task to a processor core for processing by providing the task's identifier and its initial ordering scope identifier to one of the plurality of cores. According to an embodiment, an ordering scope table is maintained by an ordering scope manager of the data processing system, where each entry of the ordering scope table corresponds to a specific task. For example, the data processing system that can handle up to 256 tasks across all of its processor cores will have an ordering scope table with 256 entries.

Once a task is assigned to a processor core, the core can wait to request permission from the ordering scope manager before requesting permission to begin executing the task. Thus, even if the processor core has only one assigned task, it will wait to execute the assigned task until it receives permission to do so from the ordering scope manager. The ordering scope manager can determine if a newly assigned task will be executed based on information stored at the ordering scope table. According to an embodiment, the ordering scope manager will determine that the task cannot execute in its initial ordering scope if the initial ordering scope is blocked by another task. For example, the initial ordering scope of a task can be considered blocked from being exclusively executed when another task is already executing the same ordering scope in an exclusive mode. If the requested ordering scope is available for execution by the task (not blocked), the ordering scope manager notifies the assigned processor core that it is enabled to begin executing the task in the initial ordering scope (e.g., the task is enabled).

When the task is enabled, a processor core can begin executing instructions of the task that are stored at an address associated with the task's current ordering scope identifier. The ordering scope manager can also determine whether hint information can be provided to individual tasks based upon the state of the ordering scope table. Hint information can be used to allow a processor core to determine whether it needs permission from the ordering scope manager to immediately exit its current task without performing a task switch. Thus, if no hint information is available for an executing task, the core will have to explicitly request permission to exit its current task, and will have to implement a full task switch when the current ordering scope is complete.

As used herein, the term data packet, or the term packet, is intended to mean either a data packet with a header and payload portion that is associated with a particular packetized data stream, the data of such a packet, or any other received datum of a stream of data that may not be associated with a specific header.

According to an embodiment, execution of a task in a particular ordering scope is not limited to only exclusive or non-exclusive operation for the entire ordering scope duration. Instead, the exclusivity of a task executing in a particular ordering scope can change from exclusive to non-exclusive in response to an instruction of the ordering scope changing the exclusivity. The determination as to whether to execute an instruction in the ordering scope that changes the exclusivity of execution can be based on the resources needed during the execution of the ordering scope. For example, if a task is scheduled to manipulate global resources at the end of the instructions in an ordering scope, the task can remain in exclusive execution for the entire ordering scope. However, another task can execute in the ordering scope but not be scheduled to manipulate any global resources.

In this case, the task can be non-exclusively executed during the entire ordering scope. In another example, a task can be scheduled to manipulate global resources only in instructions at the beginning of the ordering scope. This task can begin in exclusive execution of the ordering scope and can relinquish exclusivity of the ordering scope without transitioning out of the ordering scope or executing a task switch instruction after the instructions utilizing the global resources have been completed. A processor core relinquishing exclusivity of an ordering scope and continuing to non-exclusively execute in the ordering scope without executing a task switch instruction can increase the efficiency of the data processing system by allowing another processor core to begin exclusive execution of a task in an ordering scope having the same ordering scope ID after the first processor core relinquishes exclusivity and without having to wait for the completion of a task switch.

Various embodiments of the present disclosure will be better understood with reference to FIGS. 1-4.

FIG. 1 shows a circuit device, data processing system 100, in accordance with at least one embodiment of the present disclosure. The data processing system 100 includes various circuit portions including data processors 102 and 104, a memory 106, and a communication bus 108. The processor 102 includes an input/output module 110, such as Wire Rate Input/Output Processor (WRIOP), a queue manager 112, a work scheduler 114, an ordering scope manager 116, multiple processor cores, such as data processors 118 and 119 (also referred to herein as cores 118 and 119), a random access memory (RAM) 120, and a hardware accelerator 121. The ordering scope manager 116 includes an ordering scope table 122. In an embodiment, the various features of processor 102, such as ordering scope manager 116, and cores 118 and 119, can be general purpose or special purpose processors that can be state machines, instruction based processors, other types of logic circuits capable of performing operations, and the like. By way of example, data cores 118 and 119 are presumed to be instruction-based processors. Each of the multiple cores of system 100 is presumed to be similar to core 118 as described herein, and, therefore, includes a task table 124 that includes information about its assigned tasks.

The processors 102 and 104 can communicate with each other and memory 106 via bus 108, and can store data to or receive data from the memory 106 via the bus 108. The processor 102 can also receive and send data packets, such as Ethernet data packets, from/to other devices via the input/output module 110, which may or may not be connected to the bus 108. The input/output module 110 classifies received Ethernet packets (data packets) and provides the packets to the queue manager 112, which in turn stores the data packet in a queue (not shown). During classification, the input/output module 110 can evaluate header information of a received data packet to determine a program to process the packet and to assign the packet data a particular program ID identifying the program. Examples of various programs that can execute on a data packet include programs that perform decryption, de-compression, compression, and the like. The queue manager 112 can create/remove queues to store the data packets based on the number of packet streams received at the processor 102. Thus, upon classification, the data packet is assigned to an existing queue for that particular data stream, or a new queue is created to which the data packet is assigned.

After data packets are placed in a queue, the work scheduler 114 can assign tasks, on a packet-by-packet basis, by assigning each one of the data packets and a corresponding program to a corresponding task that in turn is assigned to a processor core for execution. According to an embodiment, the work scheduler can provide task specific information to the ordering scope table 122 and to a task table 124 of one of the processor cores. An example of task information stored at ordering scope table 122 is illustrated at Table 1, below, which includes entries for active tasks at a time T0. A column of Table 1 labeled "Task" lists identifiers (Task IDs) for tasks of the processing system, where each row is associated with a different task. It will be appreciated that because there is a one-for-one relationship between tasks and entries of the ordering scope table 122, that an actual Task ID may not actually be stored at the ordering scope table 122, as each entry can correspond to an index value specific to a unique task (e.g., the first entry of table 122 can be understood to correspond to Task0). For convenience, only the active tasks are shown in the tables herein.

TABLE 1

Ordering scope table (Time T0)

| Task | OS ID | Exclusive | Transition Position | Exclusive Position | First In Scope | Incremental Scope Exclusive | Hint State |
|---|---|---|---|---|---|---|---|
| Task0 | OS1 | 1 | 0 | 0 | 1 | — | Invalid |
| Task1 | OS4 | 1 | 0 | 0 | 1 | — | Invalid |
| Task2 | OS1 | 1 | 1 | 1 | 0 | — | Invalid |
| Task3 | OS6 | 0 | 0 | — | 1 | — | Invalid |
| Task4 | OS1 | 0 | 2 | — | 0 | — | Invalid |

A column of Table 1 labeled "OS ID" indicates the active (current) ordering scope of each task (e.g., either the ordering scope being executed or to be executed by a processor core).

A column of Table 1 labeled "Exclusive" indicates whether a corresponding task executes in its current ordering scope exclusively or non-exclusively. According to a specific embodiment, only one task can execute exclusively in a given ordering scope at a time. Conversely, any number of tasks can execute non-exclusively in a given ordering scope. Thus, multiple tasks can non-exclusively execute concurrently in the same ordering scope—either by themselves or along with one task exclusively executing in the same ordering scope.

In the specific embodiment of Table 1, OS1 is the current ordering scope for Task0, Task2, and Task4. Task0 and Task2 are also indicated as exclusively executing in OS1, as indicated by a one (1) in their respective Exclusive columns. Task4 is indicated as non-exclusively executing in OS1, as indicated by a zero (0) in its Exclusive column. Note that information as to whether a task is to exclusively or non-exclusively execute in a particular ordering scope can be defined by the task's program, as will be described in greater detail below.

A column of Table 1 labeled "Transition Position" indicates an order that each task entered its indicated ordering scope relative to when other tasks in the ordering scope table entered the same ordering scope. According to an embodiment, the indicated order of the Transition Position can be used to indicate the order in which a task can exit out of its ordering scope relative to other tasks executing in the same ordering scope. Thus, in Table 1, a value of zero (0) is stored at the Transition Position field of Task0, Task1, and Task3 to indicate they are first-in-order tasks, relative to their respective ordering scopes—OS1, OS4, and OS6, respectively. Thus, each of these tasks will be the next task allowed to exit their respective ordering scopes because they were the first task assigned to their respective ordering scopes. However, in Table 1, Task2 has a Transition Position of one (1) because Task0 was assigned to the same ordering scope, OS1, before Task2. Similarly, Task4 has a Transition Position of two (2) because Task0 and Task2 were both previously assigned OS1.

A column of Table 1 labeled "Exclusive Position" indicates a relative order as to when a task with an asserted Exclusive field (e.g., a value of one (1)) is to be allowed to start exclusively executing in its indicated ordering scope relative other tasks waiting to exclusively execute in the same ordering scope. Thus, if the Exclusive field of a task is negated, its Exclusive Position has no meaning for that task. By way of example, the order that exclusive tasks are to be executed is presumed to be the same sequence as the tasks were assigned to the ordering scope table. Thus, in Table 1, a value of zero (0) is stored at Task0 and Task1 to indicate they are first-in-order, relative to their respective ordering scopes OS1 and OS4, for exclusive execution (first-in-execution-order), and a value of one (1) is stored at Task2 to indicate it is second-in-order for exclusive execution relative to OS2.

Columns labeled "First In Scope" and "Incremental Scope Exclusive" store information that can provide a hint (hint information) to a processor core as to whether a corresponding task assigned to the processor core can transition from its current ordering scope to a next ordering scope immediately and without performing a task switch. The First In Scope field stores a value that indicates whether or not a corresponding task is first-in-transition-order for its ordering scope, which occurs when the task was the first task of the ordering scope table to be enabled to begin execution. Thus, the First In Scope field of a task will be one (1) when the Transition Position field of the task is zero (0). Otherwise, the First In Scope field of the task will be zero (0) when the Transition Position field of the task is one (1) or greater.

The Incremental Scope Exclusive field stores a value that indicates whether or not the task will be able to execute exclusively or non-exclusively in a next anticipated ordering scope. According to an embodiment, the anticipated next-in-transition-order ordering scope of the task is the ordering scope having an OS ID that is determined by incrementing the current OS ID of the task. The Incremental Scope Exclusive field is asserted (e.g., a value of one (1)) to indicate the task will be able to execute exclusively, or non-exclusively, in the anticipated next ordering scope. The Incremental Scope Exclusive field is negated to indicate that the task will only be able to execute non-exclusively in the anticipated ordering scope. A dash (-) in the Incremental Scope Exclusive filed indicates that the value has not yet been determined.

The column labeled "Hint Status" provides a status indicator that pertains to the hint information at columns First In Scope and Incremental Scope Exclusive. A status indicator of "Invalid" indicates that hint information is not valid (e.g., has not been determined by the ordering scope manager 116). A status indicator of "Valid/Sent" indicates that hint information is valid (e.g., has been determined by the ordering scope manager 116), and has been sent to a processor core executing the task. A status indicator of "Valid/Received" indicates that hint information sent to a processor core of a task is being relied upon by the processor core executing the task. Use of the hint information will be discussed in greater detail herein.

As stated above, the information at different fields of each task entry in the ordering scope table can be utilized to determine whether a particular task is a current task or a pending task. In an embodiment, an active task is current unless a condition exists that prevents the task from starting execution of an ordering scope. For example, in Table 1, active Task2 is a pending task because it is prevented from executing in OS1 because its Exclusive Position field is set to one (1), which indicates that Task2 needs to execute in OS1 exclusively, and that another task is already exclusively executing in OS1. In different embodiments, the ordering scope table may have different entries (more or less) than described herein, and the ordering scope manager 116 can still utilize the ordering scope table 122 in substantially the same manner.

In addition to updating the ordering scope table 122 as packets are assigned to tasks, the work scheduler 114 also assigns the tasks to processor cores for execution. Information for each task assigned to processor core 118 by the work scheduler 114 is stored in a corresponding entry of task table 124. For example, Table 2 illustrates the state of task table 124 of processor core 118 at time T0, wherein processor core 118 has been assigned to execute tasks Task0, Task1, and Task2, as indicated by the task identifiers listed in the column labeled "Task".

TABLE 2

Task Table 124 for Processor Core 118 (Time T0)

| Task | Data Packet | Inhibit | Waiting | Exclusive Transition | Order Scopes |
|---|---|---|---|---|---|
| Task0 | DP1 | 1 | 1 | — | OS1, OS2, OS3 |
| Task1 | DP2 | 1 | 1 | — | OS4, OS5 |
| Task2 | DP4 | 1 | 1 | — | OS1, OS2, OS3 |

The work scheduler 114 further stores task information at each core's task table 124 that identifies the packet data being processed by the corresponding task, wherein this information can be used to access the actual packet data. For example, the column of Table 2 labeled "Data Packet" indicates the packet data being processed by each assigned task. In operation, this information can be an address, or other information that can be used to determine the address where the packet data is stored. Thus, the packet data for packet DP1 is to be processed by Task0, the packet data for a packet DP2 is to be processed by Task1, and the packet data for a packet DP4 is to be processed by Task2.

The work scheduler 114 also stores information at the task table 124 that indicates the location of the program code corresponding to the task that is to be used by the processor core to process the packet data. By way of example, this information is represented at Table 2 in the column labeled "Ordering Scopes". It will be appreciated, that only the program code location of the current ordering needs be stored in the task table 124, but for convenience of discussion, all of the ordering scopes of each task are listed. Thus, Task0 includes three ordering scopes: OS1, OS2, and OS3; Task1 includes two ordering scopes OS4 and OS5; and Task2 includes three ordering scopes: OS1, OS2, and OS3. Ordering scopes are struck-through in subsequent tables if their execution has been completed. Note, that the programs being executed by Task0 and Task2 are different instantiations of the same program code, and therefore most likely have the same sequence ordering scopes, though this is not a requirement.

The ordering scopes of a task can be defined by the program code based upon an understanding of a programmer or compiler as to the resources used by particular code portions when executed by a task. The ordering scopes of a task can be indicated in the task code through the use of ordering scope transition instructions that are located in the task software at an ordering scope boundary, such as at the last instruction of each ordering scope. An ordering scope transition instruction can indicate a next ordering scope of the task to be executed, if any, and whether the task is to exclusively execute in the next ordering scope. Thus, neither the processor cores nor the ordering scope manager need to have a priori knowledge as to the exclusivity of ordering scopes to be executed by a task. As mentioned previously, according to an embodiment, multiple tasks are not allowed to exclusively execute in the same ordering scope at the same time, thereby avoiding conflicts. Conversely, multiple tasks can be allowed to non-exclusively execute in the same ordering scope concurrently, along with up to one (1) exclusive ordering scope.

The column of Table 2 labeled "Inhibit" indicates whether processor core 118 is inhibited or enabled to execute a task corresponding to the entry. By way of example, a value of one (1) indicates the corresponding task is inhibited from executing in the indicated pending ordering scope, and a value of zero (0) indicates the corresponding task has been enabled to execute in the indicated ordering scope. Each processor core is assumed to be able to execute one enabled core at a time.

Columns labeled "Waiting" and "Exclusive Transition" can store information based upon hint information provided by the ordering scope manager. The Waiting field is asserted (e.g., one (1)), by default, to indicate the processor core needs to request permission from the ordering scope manager to exit a task execution in the current ordering scope, and needs to implement a task switch prior to transitioning to task execution in a different ordering scope. The Waiting field can be negated in response to receiving hint information from the ordering scope manager. A negated Waiting field indicates that, depending on the state of the task/ordering scope combination, the processor core may be able to transition immediately without a task switch (e.g., may not need to request permission to exit the current ordering scope, nor may it need to implement a task switch before transitioning).

The value of the Exclusive Transition field is "-" when the Waiting field is asserted (e.g., has a value of one (1)) to indicate that the field does not contain valid hint information. When the Waiting field is negated, the Exclusive Transition field is used by the processor core to determine whether it is necessary to wait before exiting a task, and whether a task switch is to be performed when exiting, as will be discussed in greater detail below.

Table 3 corresponds to the task table of a processor core other than processor core 118, presumed herein to be processor core 119. As illustrated, the second processor core has two tasks assigned thereto: Task3 that is to execute task program code that implements ordering scopes OS6, OS7, and OS8 to process packet data DP3; and Task4 that is to execute the same program code as Task0 and Task2 to process packet data DP5.

TABLE 3

Task Table for Processor Core 119 (Time T0)

| Task | Data Packet | Inhibit | Waiting | Exclusive Transition | Order Scopes |
|---|---|---|---|---|---|
| Task3 | DP3 | 1 | 1 | — | OS6, OS7, OS8 |
| Task4 | DP5 | 1 | 1 | — | OS1, OS2, OS3 |

Work scheduler 114 can assign a task to a particular core based on the resources used to perform the task, the availability of each processor core, and the like. The work scheduler 114 can continue defining and assigning tasks until no more data packets remain unassigned in the processor 102 or until all of the task table entries of the processor cores are full. In an embodiment, each processor core can have up to sixteen tasks assigned—one to each entry of its task table, wherein the data processing system 100 could have up to two hundred and fifty-six possible tasks, each one corresponding to an entry of the ordering scope table 122. The work scheduler 114, or other resources, can also retrieve the packet data from a queue, and store the packet data for each of the tasks in the RAM 120.

In an embodiment, the ordering scope manager 116 controls when tasks can execute in their various ordering scopes by responding to requests from the processor cores to execute various tasks. Beginning at Table 4, which illustrates a state of ordering scope table 122, an embodiment of exemplary operation is described beginning at an initial time T0 that is different from the embodiment described previously with respect Tables 1-3, which also was described with reference to a different initial time referred to as T0. Note that for ease of understanding, the example beginning with Table 4 does not use the hint feature associated with columns First In Scope, Incremented Scope Exclusive, and Hint State, which will be described later. Therefore, the Waiting Field is set to its default value for each task table entry, and the Incremental Scope Exclusive field and Hint Status field are indeterminate and Invalid, respectively, for each ordering scope table entry.

At time T0 of Table 4, in response a data packet being assigned to Task0, the state of the ordering scope table represented by Table 4 indicates that Task0 has been created. The current ordering scope of Task0 is OS1, the Exclusive field is asserted (e.g., set to one (1)) to indicate Task0 needs to execute exclusively in OS1, the Transition Position and Exclusive Position fields are each set to zero (0) to indicate Task0 is the first in order task for OS1, and the First In Scope field is set to one (1) by virtue of Task0 having a Transition Position value of zero (0). According to an embodiment, in response to receiving a request from processor core 118, the ordering scope manager 116 can notify the processor core 118, to which Task0 is assigned, that it is authorized to start executing the task. This notification can be provided by sending an enable signal to the processor core 118 to enable execution of Task0, by setting an indicator at a storage location that is monitored by the processor core 118, and the like.

TABLE 4

Ordering scope table (Time T0)

| Task | OS ID | Exclusive | Transition Position | Exclusive Position | First In Scope | Incremental Scope Exclusive | Hint State |
|---|---|---|---|---|---|---|---|
| Task0 | OS1 | 1 | 0 | 0 | 1 | — | Invalid |

In response to Task0 having been enabled (e.g., authorized/released by the ordering scope manager 116) the inhibit bit at the task table of core 118 has been set to zero (0), as shown in Table 5.

TABLE 5

Task Table 124 for Processor Core 118 (Time T0)

| Task | Data Packet | Inhibit | Waiting | Exclusive Transition | Order Scopes |
|---|---|---|---|---|---|
| Task0 | DP1 | 0 | 1 | — | OS1, OS2, OS3 |

In response to the inhibit bit of Task0 being zero (0), the processor core 118 can begin executing Task0 in ordering scope OS1, which can include retrieving the initial data packet, DP1, and the instructions associated with Task0.

While Task0 is executing in OS1, the work scheduler 114 can assign one or more other data packets to tasks, which will be indicated in the ordering scope table 122. For example, at time T1, as indicated at the ordering scope table illustrated at Table 6, the work scheduler 114 has assigned four more data packets to tasks (Task1-Task4) in the manner described previously.

TABLE 6

Ordering Scope Table (Time T1)

| Task | OS ID | Exclusive | Transition Position | Exclusive Position | First In Scope | Incremental Scope Exclusive | Hint State |
|------|-------|-----------|---------------------|--------------------|----|-----------------------------|------------|
| Task0 | OS1 | 1 | 0 | 0 | 1 | — | Invalid |
| Task1 | OS4 | 1 | 0 | 0 | 1 | — | Invalid |
| Task2 | OS1 | 1 | 1 | 1 | 0 | — | Invalid |
| Task3 | OS6 | 0 | 0 | — | 1 | — | Invalid |
| Task4 | OS1 | 0 | 2 | — | 0 | — | Invalid |

For ease of discussion, it is assumed that each of Task0-Task4 was assigned in order. Therefore, because Task0, Task1, and Task3 are each the first-in-order entry of the ordering scope table for their respective ordering scopes (OS1, OS4, and OS6), they each have a value of zero (0) in their Transition Position field, and the processor cores to which they are assigned can be enabled to execute these tasks. However, because Task2 and Task4 each have the same current ordering scope as a previous entry of the ordering scope table (OS1 of Task0), their Transition Position indicators in Table 6 are displayed as one (1) and two (2), respectively, to indicate they are the second and third tasks assigned to the ordering scope table having OS1 as their current ordering scope.

According to an embodiment, the Transition Position indicators can be used by the ordering scope manger 116 to ensure tasks having the same ordering scope complete execution in the same order as they were received. Therefore, while Task2 cannot be enabled until Task0 completes exclusive execution in OS1, Task4 can be enabled because it is to non-exclusively execute in 051.

The Exclusive Position indicators of Task0 and of Task1 are zero (0) to indicate that each is the first-in-order to exclusively execute at a processor core in its current ordering scope (OS1 and 054, respectively). The Exclusive indicator of Task2 is one (1) to indicate that there was one other task (Task0) exclusively enabled to execute in its ordering scope (OS1) at the time Task2 was assigned. The Exclusive Position indicators of Task3 and Task4 are displayed as "-" to indicate this field has no meaning at Table 6 because these tasks are to non-exclusively execute in their respective ordering scopes. Thus, the ordering scope manager will not enable Task2 for execution until exclusive execution of Task0 has completed. Note that according to the embodiment described herein, execution of tasks in a common ordering scope can begin out of order relative to the time they were received, but will exit execution in the order they were received/assigned by the work scheduler 114. The value of an exclusive task's Exclusive Position indicator can be determined based upon the order that the task was created relative other exclusive tasks having the same ordering scope, or any other criteria.

At time T1, as indicated at Table 6, the First In Scope fields for Task0, Task1, and Task3 are all set to one (1) in response to their corresponding Transition Position indicators being set to zero (0). The First In Scope fields for Task2 and Task4 are set to zero (0) in response to their corresponding Transition Position indicators being set to a value other than zero (0) (e.g., they are not First In Scope tasks for their respective ordering scopes). As mentioned previously, the present example does not use hint information, and therefore the Incremental Scope Exclusive fields for Task0-Task4 are all set to initial states of "-" and the Hint State fields for Task0-Task4 are all set to an initial state of Invalid.

Table 7 and Table 8 are task tables for cores 118 and 119 at time T1 that correspond to the ordering scope table of Table 6. In particular, according to Table 7, the packet data DP2 and DP4 have been assigned to Task1 and Task2, respectively, both of which are assigned to core 118 for execution. According to Table 8, the packet data DP3 and DP5 have been assigned to Task3 and Task4, respectively, both of which are assigned to core 119 for execution.

TABLE 7

Task Table 124 for Processor Core 118 (Time T1)

| Task | Data Packet | Inhibit | Waiting | Exclusive Transition | Order Scopes |
|------|-------------|---------|---------|----------------------|--------------|
| Task0 | DP1 | 0 | 1 | — | OS1, OS2, OS3 |
| Task1 | DP2 | 0 | 1 | — | OS4, OS5 |
| Task2 | DP4 | 1 | 1 | — | OS1, OS2, OS3 |

TABLE 8

Task Table 124 of Processor Core 119 (Time T1)

| Task | Data Packet | Inhibit | Waiting | Exclusive Transition | Order Scopes |
|------|-------------|---------|---------|----------------------|--------------|
| Task3 | DP3 | 0 | 1 | — | OS6, OS7, OS8 |
| Task4 | DP5 | 0 | 1 | — | OS1, OS2, OS3 |

Based upon the ordering scope manager 116 evaluating each active task, as described with respect to Table 6, the processors have been enabled by the ordering scope manager 116 to execute Task0, Task1, Task3, and Task4, as indicated by their Inhibit fields being set to zero (0). Task2 is inhibited from executing as indicated by its Inhibit field being set to one (1). Once enabled, as indicated by a negated Inhibit field, the processor cores 118 and 119 can start executing the enabled tasks on a task-by-task basis without further intervention from the ordering scope manager. According to an embodiment, the enabled tasks are executed by their respective cores in the order that they reside in their core's task table. For example, if processor core 118 was to begin executing a task based on the information of Table 7, it would begin execution of Task0 by virtue of Task0 being enabled and being the first entry in task table 124. Similarly, processor core 119 would begin execution of Task3 by virtue of Task3 being enabled and being the first entry in task table for processor core 119.

Figure 2:
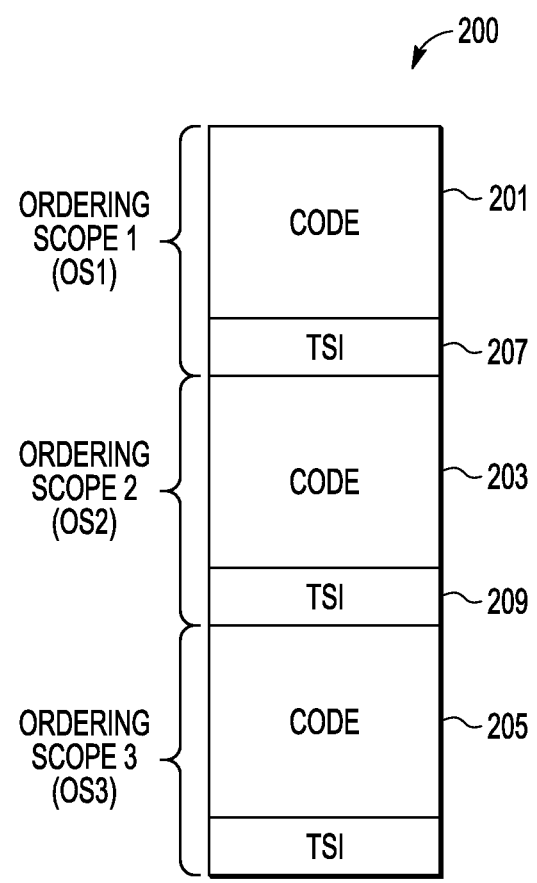
FIG. 2 illustrates a set of instructions of a task executed in a processor core of the data processing system of FIG. 1 in accordance with at least one embodiment of the present disclosure.

The enabled processor cores 118 and 119 can begin execution of a task by loading the program code (e.g., instructions for their respective task). For example, FIG. 2 illustrates a set of instructions 200 being executed at processor core 118, wherein the set of instructions 200 corresponds to Task0, and includes three code portions 201, 203, and 205 (code portions 201-205), each of which correspond to an ordering scope, such as ordering scopes OS1, OS2, and OS3. The last command of each of the task portions is a task switch instruction (TSI) that indicates the processor core 118 is to perform a task switch.

In response to finishing execution of the ordering scope OS1 code 201, the processor core 118 can execute the task switch instruction 207. The task switch instruction 207 can include an incremental transition command that provides information to processor core 118 indicating the task wants to transition to a different ordering scope. Because no valid hint information has been provided in the task tables, as indicated by the Waiting field of each entry being asserted (e.g., set to one (1)), which is its default value, the processor core will not allow the task to exit execution from its current ordering scope until it receives permission from the ordering scope manager. For example, assuming processor core 118 executes instruction 207 (FIG. 2) for Task0 in OS1 (Task0/OS1), because the Waiting field of Task0 is asserted (Table 10) the processor core 118 must request and receive permission from the ordering scope manager 116 before transitioning from Task0/OS1 and into a next ordering scope. In addition, once authorized to exit Task0/OS1 the processor core must also implement a full task switch, which results in the current task's context information being stored to, and a next task's context information being restored from, context memory once permission to exit is received—even if the stored and restored context information is for the same task. Thus, an asserted Waiting field results in waiting for permission to transition from a current task, and a full task switch in response to being authorized to exit the current task.

The processor core 118 can provide a request to transition to Task0/OS2 to the ordering scope manager 116 via a request (REQ) line of the communication bus (shown in FIG. 1) between the processor core 118 and the ordering scope manager 116. In an embodiment, the communication bus can include the REQ line, a hint information line, and a release line. In a different embodiment, the ordering scope manager 116 can have separate communication buses to each processor core or a common communication bus for all of the processor cores.

The request to transition to Task0/OS2 includes the ordering scope ID (e.g., OS2) for the next-in-order ordering scope in Task0 and can include an indicator as to whether the processor core 118 wants to execute exclusively or non-exclusively in ordering scope OS2.

When the ordering scope manager 116 receives the request to transition to Task0/OS2, via the REQ line, the ordering scope manager 116 can determine whether to authorize core 118 to transition from its current ordering scope (e.g., OS1) by determining if in-order execution, relative the task's ordering scope, will be maintained if Task0 is authorized to transition from ordering scope OS1. According to an embodiment, this can be determined based on the Transition Position indicators of the tasks current enabled for execution in the current order ordering scope of Task0 (e.g., OS1). For example, if Task0 is the oldest task in-execution-order for OS1, which includes being the only task executing OS1, the ordering scope manager 116 allows the processor core 118 to transition from the ordering scope OS1. Otherwise, the order scope manager 116 withholds authorization until any older tasks in the same ordering scope have been exited. In the present example, the ordering scope manager 116 can determine that the Transition Position field for Task0 is set to zero (0), such that the processor core 118 can transition from Task0/OS1. The ordering scope manager 116 can then send authorization to transition from Task0/OS1 to the processor core 118 via the release line of the communication bus.

When the request to transition to Task0/OS2 is sent to the ordering scope manager 116, the core 118 can assert the inhibit bit 128 associated with the task table 124 as shown in Table 9 below at time T2. Note that OS1 is struck-through in Table 9 to indicate that the task has finished executing OS1, and that the next-in-order ordering scope (e.g., OS2) is now the pending ordering scope for Task0.

TABLE 9

Task Table 124 for Processor Core 118 (Time T2)

| Task | Data Packet | Inhibit | Waiting | Exclusive Transition | Order Scopes |
|---|---|---|---|---|---|
| Task0 | DP1 | 1 | 1 | — | ~~OS1~~, OS2, OS3 |
| Task1 | DP2 | 0 | 1 | — | OS4, OS5 |
| Task2 | DP4 | 1 | 1 | — | OS1, OS2, OS3 |

After providing the authorization to transition from Task0/OS1 to the processor core 118, the ordering scope manager 116 can update the fields for all of the tasks (e.g., Task0, Task2, and Task4) in the ordering scope table 122 that were effected by the processor core 118 transitioning from Task0/OS1, as indicated in Table 10.

TABLE 10

Ordering scope table (Time T3)

| Task | OS ID | Exclusive | Transition Position | Exclusive Position | First In Scope | Incremental Scope Exclusive | Hint State |
|---|---|---|---|---|---|---|---|
| Task0 | OS2 | 0 | 0 | — | 1 | — | Invalid |
| Task1 | OS4 | 1 | 0 | 0 | 1 | — | Invalid |
| Task2 | OS1 | 1 | 0 | 0 | 1 | — | Invalid |
| Task3 | OS6 | 0 | 0 | — | 1 | — | Invalid |
| Task4 | OS1 | 0 | 1 | — | 0 | — | Invalid |

For example, the ordering scope manager 116 can update the OS ID field of Task0 to identify 052 as the ordering scope for Task0. The ordering scope manager 116 can also set the Exclusivity field of Task0 to a proper value based on the indication from processor core 118 as to whether Task0 is to be executed exclusively or non-exclusively in ordering scope OS2. Assuming that the request to transition to Task0/OS2 provided by processor core 118 indicated non-exclusive execution of the next ordering scope OS2, the ordering scope manager 116 can set the Exclusivity field of Task0 to zero (0). Note that the Transition Position indicator for Task0 is zero (0) because Task0 is the only task in the ordering scope table currently associated with ordering scope OS2, and the Exclusive Position indicator for Task0 is "-" because Task0 is to execute non-exclusively with respect to OS2. Therefore, Task0 is the first-in-transition-order for ordering scope OS2. (Note that a task that is first-in-transition-order task for a given ordering scope will exit the given ordering scope before any other task exits in the given ordering scope. The term "first-in-transition-order" and "next in-transition-order", as used herein, are synonymous terms.) The ordering scope manager 116 can provide the processor core 118 with a release of Task0 to non-exclusively execute in ordering scope OS2 via the release line of the communication bus. In response to receiving the release from the ordering scope manager 116, the processor core 118 can set the inhibit bit for Task0 in the task table 124 to zero (0) as indicated in Table 11 below.

The ordering scope manager 116 can also update the fields in the ordering scope table 122 that are associated with Task2 in response to processor core 118 transitioning from Task0/OS1. The Exclusive field for Task2 can remain set to one (1) and the Transition Position and Exclusive Position fields can both be set to zero (0) in response to Task2 now being the first-in-order task for ordering scope OS1. The ordering scope manager 116 can then provide the processor core 118 a release of Task2 to exclusively execute in ordering scope OS1, via the release line of the communication bus, in response to the Exclusive Position field being set to zero (0).

The ordering scope manager 116 can then update the fields associated with Task4. For example, the Transition Position field for Task4 can be set to one (1) in response to the ordering scope table 122 including only one previously assigned task (e.g., Task2). The Exclusive and Exclusive Position fields can remain set to zero (0) and "-" respectively based on Task2 still non-exclusively executing in ordering scope OS1. The fields for Task1 and Task3 can remain unchanged in response to processor core 118 transitioning from Task0/OS1 based on the change in ordering scope for Task0 not effecting the ordering scopes of Task1 and Task3.

At time T3, as indicated at Table 10, the First In Scope fields for Task0-Task3 are all set to one (1) in response to their corresponding Transition Position indicators being set to zero (0). The First In Scope field for Task4 is set to zero (0) in response to its corresponding Transition Position indicator being set to a value other than zero (0) (e.g., it is not First In Scope task its ordering scope). As mentioned previously, the present example does not use hint information, and therefore the Incremental Scope Exclusive fields for Task0-Task4 are all set to initial states of "-" and the Hint State fields for Task0-Task4 are all set to an initial state of Invalid.

After transitioning from ordering scope OS1, processor core 118 determines a next task to begin executing based on the current information in the task table 124 as indicated in Table 11. Note that the next task can be the same task as was just finished but operating in a different ordering scope, or can be a different task from the previous task executed in the processor core 118. At time T3, as indicated at Table 11, the Inhibit bits of Task0-Task2 have been negated to indicate that the processor core 118 has been authorized by the ordering scope manager 116 to execute in any of the tasks Task0-Task2.

TABLE 11

Task Table 124 for Processor Core 118 (Time T3)

| Task | Data Packet | Inhibit | Waiting | Exclusive Transition | Order Scopes |
|------|-------------|---------|---------|---------------------|--------------|
| Task0 | DP1 | 0 | 1 | — | ~~OS1,~~ , OS2, OS3 |
| Task1 | DP2 | 0 | 1 | — | OS4, OS5 |
| Task2 | DP4 | 0 | 1 | — | OS1, OS2, OS3 |

In an embodiment, the processor core 118 will preferentially execute tasks in its task table based upon a priority of each task. It is assumed herein that each of the tasks associated with a data stream have a common priority level and are, therefore, executed by their processor cores in the order they were received. It will be appreciated that non-data stream tasks may be given a higher priority than data stream tasks, such that the task switch instruction at the end of a current task's ordering scope results in the processor core switching tasks to execute the higher priority task before completing execution of the ordering scopes of the current task. Because the need to switch between tasks can occur frequently, integrated circuits can be designed with the expectation that a task switch is more likely to occur at the end of each ordering scope than not. Such a design can result in a task switch occurring with each occurrence of a task switch instruction in order to efficiently store and restore context information. While it is common for task switch operations to be highly efficient in terms of required clock cycles (e.g., one or two clock cycles), for applications that assign a substantial number of tasks to the same priority level, the mandatory task switch at the end of each ordering scope can result in unnecessarily storing and retrieving the task context information when the same task sequentially executes in adjacent ordering scopes.

Instead of the task switch instruction always causing task context information to be saved, execution of the task switch instruction can instead result in the processor core using hint information, provided by the ordering scope manager to selectively implement a task switch by storing or not storing the task's context information depending upon whether or not the processor core is to transition between ordering scopes of the same task.

According to an example beginning with Table 12, the ordering scope manager 116 can provide task hint information to the processor cores that can be used to determine whether a next task switch instruction actually requires a full task switch to be performed that stores/restores the task context information. The hint information can also be used to determine if in response to the task hint instruction the processor core needs to request permission to transition to a new ordering scope.

Table 12 illustrates an ordering scope table (e.g., ordering scope table 122 of FIG. 1) at a time T4 having tasks Task10 through Task14. The ordering scope manager 116 has evaluated the tasks of Table 12 to determine if hint information can be provided to the processor cores to which various tasks have been assigned. The hint information of a task can be used by a processor core to determine whether it can immediately exit a particular ordering scope, without requesting permission, and avoid performing a full task switch. Otherwise, if no hint information is available for a task, the processor cores will need to request and receive permission to exit a current task executing in a particular ordering scope in the manner described above, which includes having to implement a full task switch.

TABLE 12

Ordering Scope Table (Time T4)

| Task | OS ID | Exclusive | Transition Position | Exclusive Position | First In Scope | Incremental Scope Exclusive | Hint State |
|---|---|---|---|---|---|---|---|
| Task10 | OS2 | 1 | 0 | 0 | 1 | 1 | Valid/Sent |
| Task11 | OS4 | 1 | 0 | 0 | 1 | 1 | Valid/Sent |
| Task12 | OS1 | 1 | 0 | 0 | 1 | 0 | Valid/Sent |

Only tasks having an asserted First In Scope field need to be evaluated by the ordering scope manager 116 for possible hint information, because only these tasks are eligible to actually be executed by their processor core as describe above. Thus, each of Task10 through Task12 of Table 12 have been evaluated by the ordering scope manager to determine whether hint information can be provided to processors executing these tasks, by virtue of their First In Scope fields being asserted.

Figure 3:
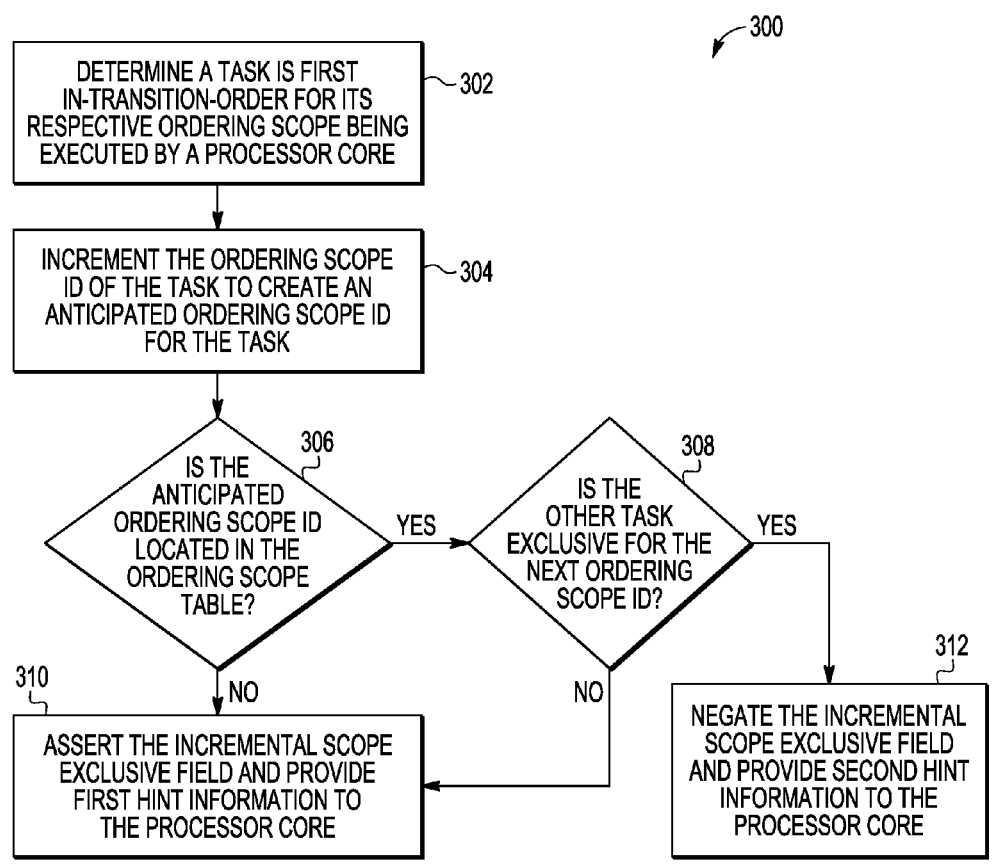
FIG. 3 illustrates a flow diagram of a method for evaluating a task by an ordering scope manager to determine whether it is associated with valid hint information within the data processing system of FIG. 1 in accordance with at least one embodiment of the present disclosure.

FIG. 3 illustrates a flow diagram of a method 300 that can be implemented by an ordering scope manager to determine whether a particular task of the ordering scope table is associated with valid hint information. At block 302, it is determined whether a task being evaluated is first in-transition-order for its respective ordering scope. For example, an ordering scope manager can determine that a task is first in-transition-order for its ordering scope if the task's Transition Position is zero (0), or if its First in Scope field is one (1). Tasks that are not first-in-transition-order do not need to be evaluated, and therefore have a Hint State of Invalid. Tasks that are first-in-order are evaluated further, beginning at block 304.

At block 304, an incremental OS ID of the current task is determined by incrementing the OS ID of the current task. The incremental OS ID of the current ordering scope is presumed by the ordering scope manager to be the OS ID of the ordering scope that is next-in-transition-order for the current task. For example, the incremental ordering scope ID for ordering scope OS1 is OS2, assuming the numerical suffix is incremented by 1 to identify the incremental ordering scope. In an embodiment, if the ordering scope ID for an ordering scope is 0b0000001, then the incremental ordering scope ID can be 0b0000010. By assuming the current task will transition to execute in ordering scope OS2, the ordering scope manager can provide hint information to the processor core assigned to the current task that can be used to determine if execution of the current task's task switch instruction requires requesting of permission from the ordering scope manager and a full task switch.

At block 306, it is determined whether the incremental ordering scope ID is associated with another task of the ordering scope table. If so, flow proceeds to block 308. Otherwise, if the incremental ordering scope ID is not in the ordering scope table, flow proceeds to block 310, where the Incremental Scope Exclusive field of the task being evaluated is asserted, and hint information indicating that the task's Waiting field can be negated and that its Exclusive Transition field can be asserted is provided to the processor core assigned to the task. By asserting the Exclusive Transition field of task table 124, it is indicated that the processor core executing the current task may be able to transition execution of the current task between ordering scopes without requesting permission to exit the current task, and without a task switch, so long as the processor core determines during execution of the task switch instruction of the current task that it is actually transitioning to execute the current task in its incremental ordering scope.

At block 308, in response to at lease one other task of the ordering scope table being associated with the incremental OS ID, it is determined whether the task(s) of the ordering scope table having the incremental OS ID is an exclusive task, as indicated by its Exclusive field being asserted. If not, flow proceeds to block 308 for processing as described previously. If so, flow proceeds to block 312, wherein the Incremental Scope Exclusive field is negated for the task being evaluated, and information is provided to the processor core indicating that the Waiting field and Exclusive Transition field of the task being evaluated can be negated. By negating these fields it is indicated that a processor can transition execution of a current task between ordering scopes without requesting permission to exit the current task, and without a task switch, so long as the processor core determines during execution of the task switch instruction of the current task that it is actually transitioning to non-exclusively execute the current task in its incremental ordering.

Thus, after being evaluated, each of Task10, Task11, and Task12 of Table 12 has valid hint information that has been sent to each task's corresponding processor core via the hint information line of the communication bus in FIG. 1, as indicated by the Hint State "Valid/Sent" at Table 13 and Table 14, which illustrate the state of task table 124 at processor cores 118 and 119, respectively.

TABLE 13

Task Table 124 for Processor Core 118 (Time T4)

| Task | Data Packet | Inhibit | Waiting | Exclusive Transition | Order Scopes |
|---|---|---|---|---|---|
| Task11 | DP21 | 0 | 0 | —/1 | OS4, OS5 |
| Task12 | DP22 | 0 | 0 | —/0 | OS1, OS2, OS3 |

TABLE 14

Task Table 124 for Processor Core 119 (Time T4)

| Task | Data Packet | Inhibit | Waiting | Exclusive Transition | Order Scopes |
|---|---|---|---|---|---|
| Task10 | DP20 | 0 | 0 | —/1 | ~~OS1~~, OS2, OS3 |

As illustrated at Table 13, the Waiting field of Task11 has been set to zero (0) based upon the hint information received from the ordering scope manager, to indicate that the task has valid hint information, and that based upon the hint information the processor core may not have to request to transition from the ordering scope of the current task. The Exclusive Transition field of Task11 has a value of "-/1", where "-" is the current value of the field, and one (1) is the received hint value of the field that can be used by the processor core. Providing both the prior value and the hint value separated by a "/" indicates that the hint information is available, but the processor core has not relied upon the hint information. Once the hint information is relied upon, the processor core will notify to the ordering scope manager that it has received the newly hint information (e.g., provide an update indicator to the ordering scope manager). The hint value 1 in the Exclusive Transition field indicates that the processor can transition to either exclusively or non-exclusively execute the current task in the anticipated ordering scope (e.g., its incremented ordering scope) without requesting permission from the ordering scope manager and without performing a task switch.

The Waiting field of Task12 at Table 13 has been set to zero (0) based upon the hint information received from the ordering scope manager, to indicate that the task has valid hint information. The Exclusive Transition field of Task12 has a value of "-/0", where "-" is the current value of the field, and zero (0) is hint value of the field that may be considered by the processor core. The hint value of zero in the Exclusive Transition field indicates that the processor core can only transition to non-exclusively execute the current task in its incremented ordering scope without requesting permission from the ordering scope manager and without performing a task switch.

The Waiting field of Task10 of Table 14 has been set to zero (0) based upon the hint information received from the ordering scope manager. The Exclusive Transition field of Task10 has a value of "-/1", where "-" is the current value of the field, and one (1) is hint value of the field that may be considered by the processor core. The hint value one in the Exclusive Transition field indicates that the processor can transition to either exclusively or non-exclusively execute the current task in its incremented ordering scope without requesting permission from the ordering scope manager and without performing a task switch.

Table 15 represents the state, at time T5, of the ordering scope table 122 in the ordering scope manager 116. Table 16 and Table 17 represent the state, at time T5, of task tables 124 for processor core 118 and 119, respectively. The Hint State field of Task10 in Table 15 is Valid/Rcd to indicate that the processor core 119 is relying upon the previously provided hint information. This is further indicated in the Table 17 by virtue of Task10 having a value of one (1) in its Exclusive Transition field, instead of "-/1". Because processor 119 is relying upon this hint information, the ordering scope manager 116 updates Task10 in the ordering scope table as indicated by the bold indicators in Table 15. Thus, the current ordering scope in the OS ID field of Task10 has been updated to be OS3, even though OS2 is still being executed, which is indicated by the struck-through OS2 indicator. The Exclusive field of Task10 has been updated to a value of one (1) to match the Incremental Scope Exclusive indicator, and the Transition Position field and the Exclusive Position field have both been updated to 0.

TABLE 16

Task Table 124 for Processor Core 118 (Time T5)

| Task | Data Packet | Inhibit | Waiting | Exclusive Transition | Order Scopes |
|---|---|---|---|---|---|
| Task11 | DP21 | 0 | 0 | 1 | OS4, OS5 |
| Task12 | DP22 | 0 | 0 | —/0 | OS1, OS2, OS3 |

TABLE 17

Task Table 124 for Processor Core 119 (Time T5)

| Task | Data Packet | Inhibit | Waiting | Exclusive Transition | Order Scopes |
|---|---|---|---|---|---|
| Task10 | DP20 | 0 | 0 | 1 | ~~OS1,~~ , OS2, OS3 |

It will be appreciated that the updated Task10 information will be used by the ordering scope manager 116 to determine how to control future ordering scope transition requests and to determine current hint information. For example, the ordering scope manager 116 can re-evaluate hint information for tasks that have asserted First In Scope indicators to determine if their previously provided hint information needs to be updated, so long as the previously provided task hint information has not yet been relied upon by its processor.

Task11 has been updated at Table 15 and at Table 16 in a similar manner as Task10 in response to the processor core 118 relying upon its provided hint information. It will be appreciated, that according to an embodiment, a processor core will only rely upon hint information for a particular task once it has begun executing the task.

Task12 remains unchanged at Table 15 and Table 16. For example, because Task12 is not currently being executed by processor core 118, its hint information has not yet been relied upon.

Figure 4:
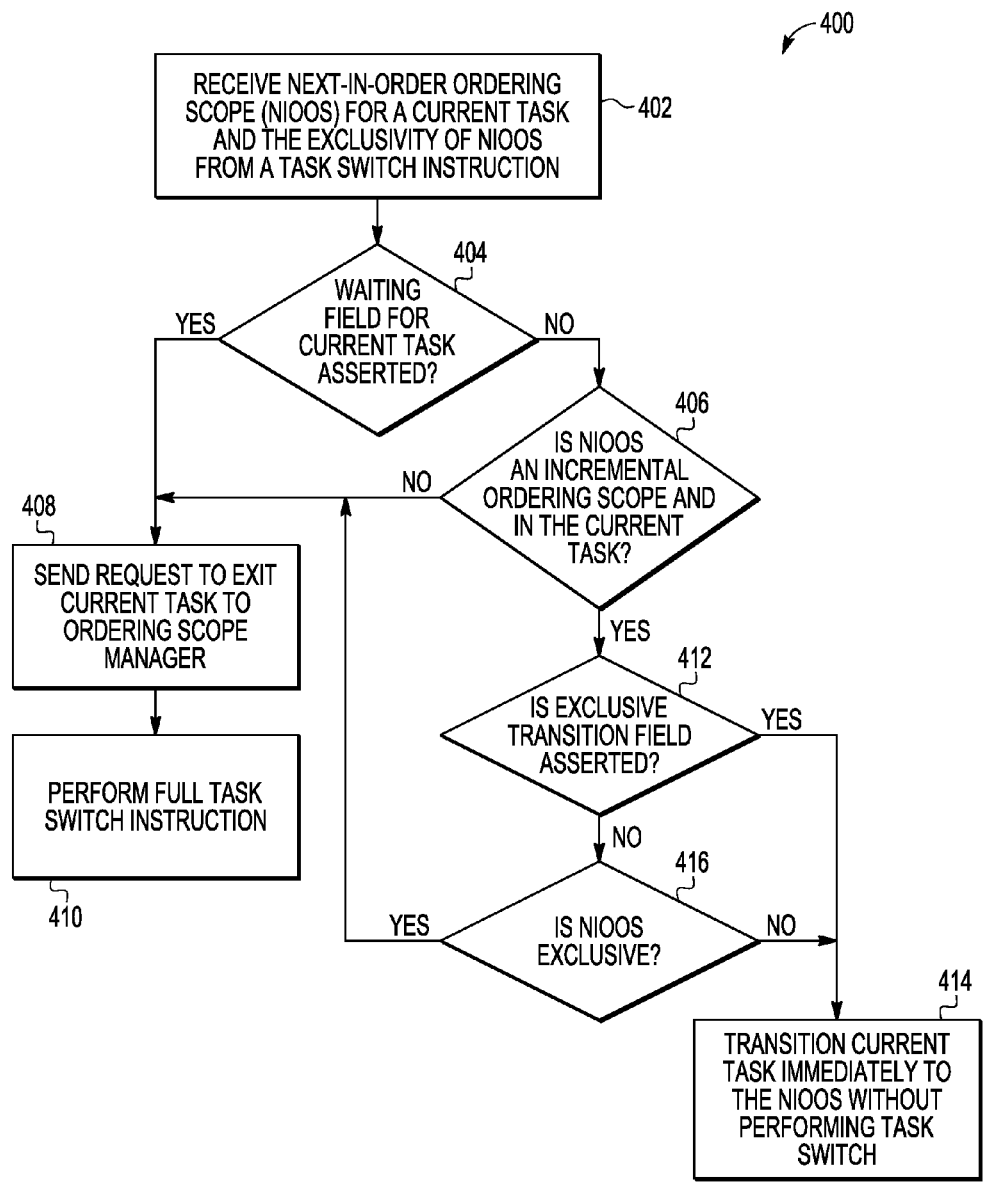
FIG. 4 illustrates a flow diagram of a method for determining whether an incremental ordering scope transition can be performed without a task switch in the processor core of the data processing system of FIG. 1 in accordance with at least one embodiment of the present disclosure.

In response to valid task information of a current task residing at a processor core's task table at the time a task switch instruction of the current task is executed, the processor core will determine if it can immediately begin executing the current task in the next ordering scope without performing a task switch. FIG. 4 illustrates a particular embodiment of a flow diagram of a method 400 that illustrates the manner a processor core can determine whether an ordering scope transition can occur immediately without a task switch. At block 402, task transition information for a currently executing task's next-in-order ordering scope is received at a processor core based upon execution of a task switch instruction. The information includes the ordering scope ID for the next-in-order ordering scope of the task and an exclusivity indicator of the next-in-order ordering scope.

TABLE 15

Ordering Scope Table (Time T5)

| Task | OS ID | Exclusive | Transition Position | Exclusive Position | First In Scope | Incremental Scope Exclusive | Hint State |
|---|---|---|---|---|---|---|---|
| Task10 | ~~OS2~~ OS3 | 1 | 0 | 0 | 1 | 1 | Valid/Rcd |
| Task11 | ~~OS4~~ OS5 | 1 | 0 | 0 | 1 | 1 | Valid/Rcd |
| Task12 | OS1 | 1 | 0 | 0 | 1 | 0 | Valid/Sent |

For example, execution of the task switch instruction of Task11/OS4 can indicate that execution of Task11 is to transition from OS4 to OS5.

At block 404, a determination is made whether a Waiting field for the currently executing task is asserted. If it is determined at block 404 that the Waiting field is negated for the currently executing task and that valid hint information exists, the flow proceeds to block 406. Otherwise, if the Waiting field is asserted, the hint information is not valid and the flow proceeds to block 408, wherein a request to exit the current task is sent from the processor core to the ordering scope manager, and a full task switch is performed at block 410 in response to permission to exit the current task being received. With respect to Task11, because its Waiting field is negated at Table 16, flow processed to block 406.

At block 406, a determination is made whether the next-in-order ordering scope received from the task switch instruction is the incremental ordering scope ID of the current task, as presumed by the ordering scope manager at the time the hint information was generated. If not, or if the processor core is to transition to a different task entirely, the flow proceeds to block 408 as described previously. If so, the hint information is relevant to the transition being performed, and the flow proceeds to block 412. With respect to Task11, the processor core will determine while executing the task switch instruction that the next ordering scope for Task11, OS5, is incremental to Task11's current ordering scope, OS4, and flow proceeds to block 412.

At block 412 a determination is made by the processor core whether the Exclusive Transition field for the current task is asserted. If so, the processor core can either exclusively or non-exclusively execute the current task in its incremental ordering scope, and flow, therefore, proceeds to block 414 where the current task is transitioned immediately to the next-in-order ordering scope without a task switch being performed. Otherwise, if the Exclusive Transition field for the current task is negated, the processor core can only non-exclusively execute the current task in its incremental ordering scope and flow proceeds to block 416. With respect to Task11, the processor core will determine that the Exclusive Transition field is asserted and will immediately transition as indicated at block 414.

At block 416, in response to the Transition field being negated, it is determined at the processor core whether a task switch instruction has indicated a task is to non-exclusively execute the incremental ordering scope. If so, flow proceeds to block 414 where the task is immediately transitioned to its incremental ordering scope without a task switch. Otherwise, flow proceeds to block 408 where the processor core requests permission to exit the current task in the manner previously described.

Thus, referring to Table 16, Task11 has valid hint information stored in the task table of its processor core that can be relied upon by processor 118, and can transition immediately to exclusively execute Task11 in OS5 as described with reference to FIG. 4. After transitioning, the processor core can re-assert the Waiting field in the task table 124 and clear the Exclusive Transition field for Task11 as indicated at time T6 in Table 18. The ordering scope OS4 for Task11 is also struck through to indicate that the ordering scope OS4 has been exited.

TABLE 18

Task Table 124 for Processor Core 118 (Time T6)

| Task | Data Packet | Inhibit | Waiting | Exclusive Transition | Order Scopes |
|---|---|---|---|---|---|
| Task11 | DP21 | 0 | 0 | — | ~~OS4~~, OS5 |
| Task12 | DP22 | 0 | 0 | —/0 | OS1, OS2, OS3 |

The processor core 118 can also provide an indication to the ordering scope manager 116 to update the current ordering scope of Task5 in the ordering scope table 122 as indicated at time T7 in Table 19 below.

TABLE 19

Ordering Scope Table (Time T7)

| Task | OS ID | Exclusive | Transition Position | Exclusive Position | First In Scope | Incremental Scope Exclusive | Hint State |
|---|---|---|---|---|---|---|---|
| Task10 | ~~OS2~~ OS3 | 1 | 0 | 0 | 1 | 1 | Valid/Rcd |
| Task11 | OS5 | 1 | 0 | 0 | 1 | 1 | Valid/Sent |
| Task12 | OS1 | 1 | 0 | 0 | 1 | 0 | Valid/Sent |

Note that at Time T7, not only has the information for Task11 been updated based on execution in OS5, but the ordering scope manager 116 has also evaluated Task11 to determine whether new hint information can be provided to processor core 118. Thus, as illustrated in Table 19, Task11 has valid hint information that has been sent to processor core 118 as indicated by the Hint State "Valid/Sent". Note that the hint evaluation of Task11 is based on the presumption that Task11 will next operate in incremental ordering scope OS6, which is an invalid assumption (see order scope information for Task 11 at Table 18). Table 20 illustrates the resulting state of task table 124 at processor core 118 at time T7.

TABLE 20

Task Table 124 for Processor Core 118 (Time T7)

| Task | Data Packet | Inhibit | Waiting | Exclusive Transition | Order Scopes |
|---|---|---|---|---|---|
| Task11 | DP21 | 0 | 0 | —/1 | ~~OS4~~, OS5 |
| Task12 | DP22 | 0 | 0 | —/0 | OS1, OS2, OS3 |

In particular, the Waiting field of Task11 has been set to zero (0) based upon the new hint information received from the ordering scope manager, to indicate valid hint information has been received. The Exclusive Transition field of Task11 has a value of "-/1", where "-" is the prior value of the field, and one (1) is hint value of the field based upon the hint information. The hint value one in the Exclusive Transition field indicates that the processor can transition to either exclusively or non-exclusively execute the current task in the anticipated incremental ordering scope without requesting permission from the ordering scope manager and without performing a task switch.

Table 21 represents the state at time T8 of the ordering scope table 122 in ordering scope manager 116. Table 22 represents the state at time T8 of task table 124 for processor core 118. The Hint State field of Task11 in Table 21 is Valid/Rcd to indicate that the processor core 118 has received, and is relying upon the provided hint information for Task11. This is further indicated in the Table 22 by virtue of task table 124 for processor core 118 having a value of one (1) in its Exclusive Transition field of Task11, instead of the value "-/1". Because the processor 118 is relying upon this hint information, the ordering scope manager 116 updates the entry in the ordering scope table for Task11 as indicated by the bold indicators in Table 21. Thus, the OS ID field has been updated to OS6, even though OS5 is still being executed; the Exclusive field has been updated to a value of one (1) to match the Incremental Scope Exclusive indicator; and the Transition Position field and the Exclusive Position field have both been updated to 0.

TABLE 21

Ordering Scope Table (Time T8)

| Task | OS ID | Exclusive | Transition Position | Exclusive Position | First In Scope | Incremental Scope Exclusive | Hint State |
|---|---|---|---|---|---|---|---|
| Task10 | ~~OS2~~ OS3 | 1 | 0 | 0 | 1 | 1 | Valid/Rcd |
| Task11 | ~~OS5~~ OS6 | 1 | 0 | 0 | 1 | 1 | Valid/Rcd |
| Task12 | OS1 | 1 | 0 | 0 | 1 | 0 | Valid/Sent |

TABLE 22

Task Table 124 for Processor Core 118 (Time T8)

| Task | Data Packet | Inhibit | Waiting | Exclusive Transition | Order Scopes |
|---|---|---|---|---|---|
| Task11 | DP21 | 0 | 0 | 1 | ~~OS4~~, OS5 |
| Task12 | DP22 | 0 | 0 | —/0 | OS1, OS2, OS3 |

Thus, referring to Table 22, Task11 has valid hint information stored in the task table 124 of processor core 118 that is being relied upon by the processor core. In response to completing execution of Task11 in ordering scope OS5, the task switch instruction will indicate that the current task is to be exited, and that there is no other ordering scope in the present task. Because there is no next ordering scope for the current task, the hint information for Task11 is not relevant, and the processor core 118 sends a transition request to the ordering scope manager 116, and implements a full task switch when authorized to exit the current ordering scope.

As a result of the full task switch, the ordering scope manager 116 can authorize the processor core 118 to exit Task11/OS5, which completes Task11, and results in Task11 being removed from the task table 124 of processor core 118 as indicated at time T9 in Table 23.

TABLE 23

Task Table 124 for Processor Core 118 (Time T9)

| Task | Data Packet | Inhibit | Waiting | Exclusive Transition | Order Scopes |
|---|---|---|---|---|---|
| Task12 | DP22 | 0 | 0 | —/0 | OS1, OS2, OS3 |

Processor core 118 can then begin executing the next enabled task (e.g., Task12/OS1) in the task table 124, which can cause the ordering scope table 122 and the task table 124 of processor core 118 to be updated at time T10 as indicated in Table 24 and Table 25, respectively. Also, at time T10 processor core 119 is continuing to exclusively execute Task10 in ordering scope OS2, as indicated in Table 17.

Table 24 represents the state at time T10 of the ordering scope table 122. Table 25 represents the state at time T10 of task table 124 for processor core 118. The Hint State field of Task12 in Table 24 is Valid/Rcd to indicate that the processor core 118 is relying upon the previously received hint information for Task12. This is further indicated in Table 25 by virtue of task table 124 for processor core 118 having a value of zero (0) in its Exclusive Transition field instead of the value "-/0". Because the processor 118 is relying upon this hint information, the ordering scope manager 116 updates the entry in the ordering scope table for Task12 as indicated by the bold indicators in Table 24. Thus, the OS ID of Task12 has been updated to be OS2, even though OS1 is still being executed; the Exclusive field of Task12 has been updated to a value of zero (0) to match the Incremental Scope Exclusive indicator; and the Transition Position field and the Exclusive Position field of Task12 have both been updated to 0.

TABLE 24

Ordering Scope Table (Time T10)

| Task | OS ID | Exclusive | Transition Position | Exclusive Position | First In Scope | Incremental Scope Exclusive | Hint State |
|---|---|---|---|---|---|---|---|
| Task10 | ~~OS2~~ OS3 | 1 | 0 | 0 | 1 | 1 | Valid/Rcd |
| Task12 | ~~OS10~~ OS2 | 1 | 0 | 0 | 1 | 0 | Valid/Rcd |

TABLE 25

Task Table 124 for Processor Core 118 (Time T10)

| Task | Data Packet | Inhibit | Waiting | Exclusive Transition | Order Scopes |
|---|---|---|---|---|---|
| Task12 | DP22 | 0 | 0 | 0 | OS1, OS2, OS3 |

Table 25 illustrates the hint information for Task12 assigned to processor core 118. Upon completion of execution of Task12, the task switch instruction will provide information to processor core 118 that Task12 is to transition to OS2 for exclusive operation. Because the Waiting field for Task12 is negated, there is valid hint information for Task12, and the processor core 118 determines whether the ordering scope ID of the next-in-order ordering scope (OS2) is the incremental ordering scope ID of the current task. In the present example, the ordering scope ID of the next-in-order ordering scope of Task12 is incremental so the Transition Exclusive field needs to be evaluated.

Because the Transition Exclusive field has been negated, the processor core 118 can only transition immediately to non-exclusively execute Task12 in its incremental ordering scope (OS2). Thus, because the requested task switch is exclusive, as directed by the task switch instruction, the processor core needs to request permission from the ordering scope manager 116 to transition to exclusively execute Task12 in OS2, and when permission is granted, processor 118 will implement the transition with a full task switch as described above.

In certain situations, a processor core can receive valid hint information for a current task after the current task has begun executing its current ordering scope's task switch instruction. In this situation, during the transition of the current task to its next ordering scope, the processor core will ignore the hint information, and instead request authorization from the ordering scope manager to implement the transition. When this occurs, the ordering scope manager provides a release signal in response to the request, and the processor core need not indicate that the late hint information was ever relied upon. In this manner, the late hint information does not inadvertently cause the processor core to perform an invalid incremental ordering scope transition.

It will be appreciated that the hint information sent from the ordering scope manager to the processor core is only a hint because there is no guarantee in the data processing system 100 that the state of the Waiting field and Exclusive field for a task will be set before the task switch instruction is executed, and if it is set in a timely matter the hint information will only facilitate transition when the actually transition ordering scope matches an anticipated ordering scope.

In an embodiment, the hint information for a task can be acknowledged by its processor core as soon as the core begins executing that task, even though the task switch instruction is yet to be encountered. In this situation, it may be desirable for the processor core to relinquish the hint information—provided the hint information has not been evaluated in the context of an actual task switch instruction. For example, if, after the ordering scope manager has received notice from one core that hint information for a particular task has been received, another processor core requests to transition into the ordering scope authorized by the acknowledged hint information, the ordering scope manager can send a request to the processor core that has acknowledged the hint to release the hint. For example, the processor core would rescind its acknowledgment of the hint so long as the task switch instruction of the task corresponding to the hint has not begun execution. In this situation, upon receiving notice that the processor core receiving the hint has relinquished the hint, the ordering scope manager can authorize the other processor core to exit its current task. Furthermore, by virtue of rescinding its acknowledgment of the hint, the original processor can re-assert its Waiting field.

Because there are multiple ways to save or not save task context information, the term "performing a task switch", as used herein with respect to transitioning from a task executing in a current ordering scope, is intended to mean that context information of the processor core executing the task in the current ordering scope is saved so that the context information can be subsequently retrieved to restore the processor core to the same context state. The terms "without performing a task switch", "not performing a full task switch", "ignoring a task switch", and their variants, as used herein with respect to transitioning from a task executing in a current ordering scope, is intended to mean that context information of the processor core executing the current task is not saved for subsequent retrieval. In alternate embodiments these terms can include/not include restoring context data for a test.

The process of providing a hint to the processor core can be performed with respect to both an ordering scope transition as described above and also with respect to a semaphore lock transition. During a semaphore operation the semaphore unit can perform the same operations as the ordering scope manager. However, for simplicity these operations have been discussed only with respect to an ordering scope manager and ordering scope transitions.

As discussed above, the efficiency of the data processing system 100 can be increased by the execution of the task switch instruction resulting in the processor core using hint information, provided by the ordering scope manager, to selectively implement a task switch. This selective implementation can result in the processor core either storing or not storing the task's context information depending upon whether or not the processor core is to transition between ordering scopes of the same task. Another technique that can be used with, or without, the hint technique is the addition of a processor core feature for relinquishing exclusive execution of task in an ordering scope to further increase the efficiency of the data processing system 100.

During the previous discussion, an assumption was made that once a processor core begins executing a task, either exclusively or non-exclusively, in a particular ordering scope, the processor core executes the task in the same exclusivity mode throughout the entire ordering scope. However, in another embodiment, a processor core exclusively executing a task in a particular ordering scope can relinquish exclusivity of the ordering scope so that the processor core transitions from exclusive execution to non-exclusive execution of the task in the same ordering scope without having to perform a task switch. Transitioning a task from exclusive execution to non-exclusive execution in the same ordering scope, at the time a resource conflict no longer occurs, can reduce the number of task switch instructions that need to be executed without increasing the time a task requires exclusive execution. Also, relinquishing of exclusivity can enable another core to exclusively execute in the same ordering scope sooner than if the processor core did not relinquish exclusivity.

Figure 5:
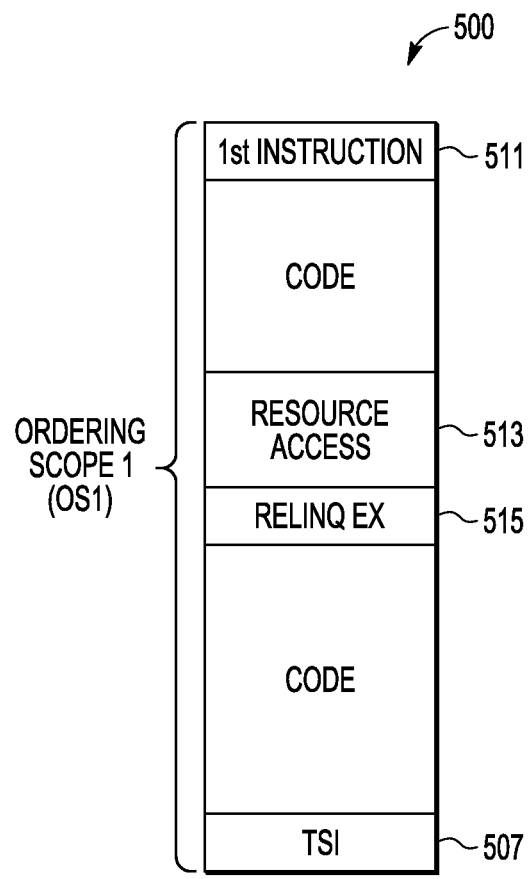
FIG. 5 illustrates a set of instructions of another task executed in a processor core of the data processing system of FIG. 1 in accordance with at least one embodiment of the present disclosure.

FIG. 5 illustrates a set of instructions 500 to be executed at processor core 118, wherein the set of instructions 500 corresponds to ordering scope OS1 of a task referred to as Task20, and includes a plurality of different instructions to be executed including a first instruction 511, a resource access instruction 513, a relinquish exclusivity instruction 515, and a task switch instruction 507. The code of ordering scope OS1 can be similar to the code discussed above with respect to FIG. 2 except that the exclusivity mode of ordering scope OS1 can transition from exclusive to non-exclusive for Task20 as will be discussed in more detail below.

By way of example, processor core 118 begins exclusively executing Task20 at the first instruction 511. The processor core 118 can continue exclusively executing Task20 in ordering scope OS1 through the resource access instruction 513, which can cause the processor core to access and/or manipulate one or more global resources (e.g., retrieve/manipulate values stored at global memory addresses) in the data processing system 100. In the present example, this resource needs to be dedicated to OS1 until the access by instruction 513 is complete. At that point, there are no other global resources accesses in ordering scope OS1 to cause the exclusive execution of Task20 in OS1 to continue. Therefore, after executing the resource access instruction 513, the processor core 118 no longer needs exclusive access to the code of ordering scope OS1, such that the processor core 118 can relinquish exclusivity of ordering scope OS1.

Figure 6:
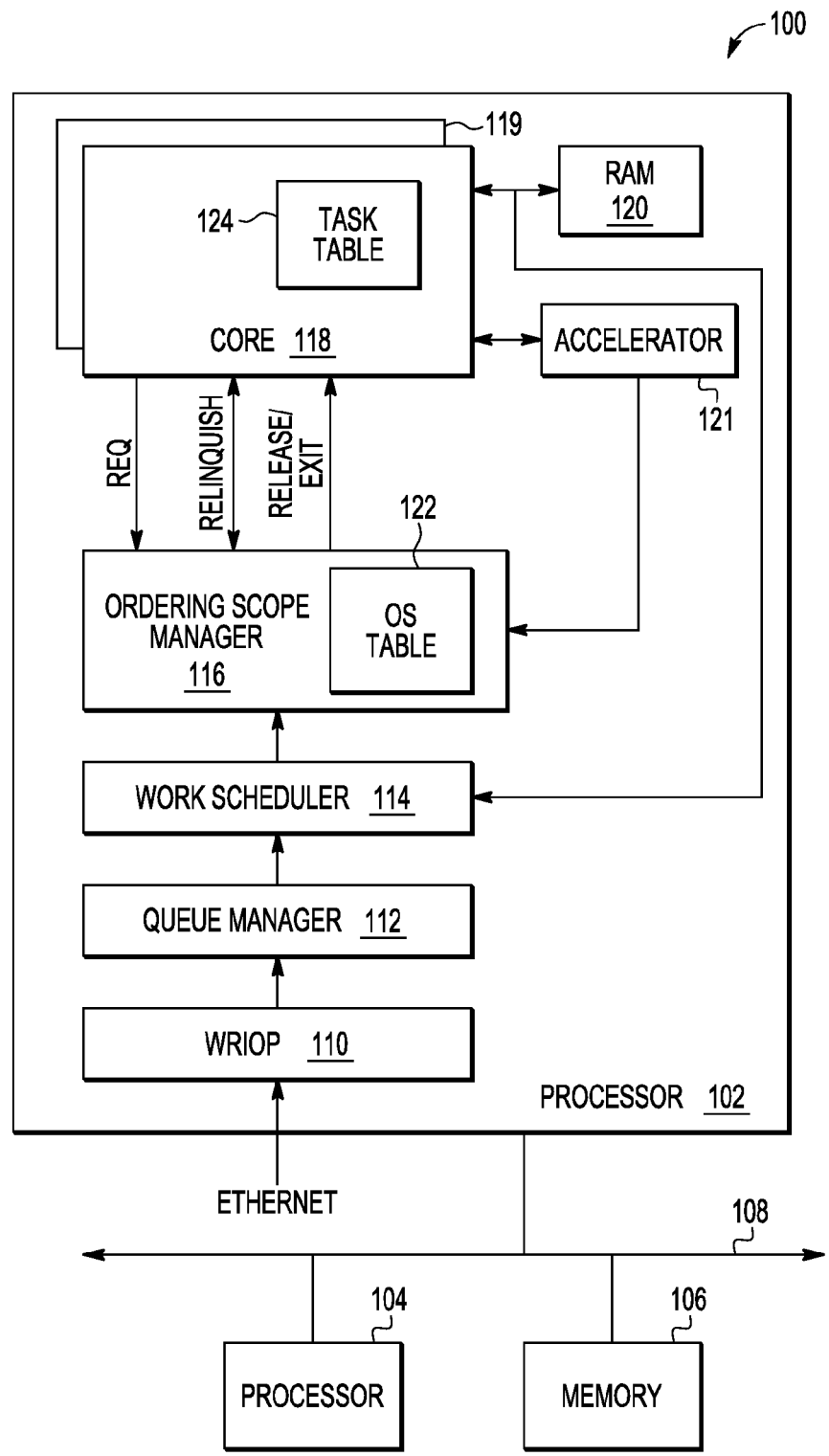
FIG. 6 illustrates another embodiment of the data processing system of FIG. 1 in accordance with at least one embodiment of the present disclosure.

This can be accomplished by processor core 118 executing the relinquish exclusivity instruction 515, to cause the processor core 118 to provide a relinquish indicator to the ordering scope manager 116. The relinquish indicator can be a command sent via a relinquish line of the communication bus shown in FIG. 6, setting a bit associated with the relinquish exclusivity instruction 515. In this embodiment of the data processing system 100, the hint line, shown in FIG. 1, has been replaced with the relinquish line. However, it should be understood that in another embodiment, the data processing system 100 can include both the hint line of FIG. 1, and the relinquish line of FIG. 6. In response to receiving the relinquish indicator, the ordering scope manager 116 can negate the exclusive field associated with Task20 to indicate that Task20 is now being non-exclusively executed in ordering scope OS1 as will be discuss in more detail below. The processor core 118 can also continue non-exclusively executing the code of ordering scope OS1 without having to yield to task scheduling of the ordering scope manager 116. The processor core 118 does not have to yield to task scheduling until exclusivity is again needed, so long as OS1 can be non-exclusively executed with any number of other tasks executing non-exclusively in OS1. Accordingly, the code of OS1 can include a conditional instruction that can selectively cause the processor core 118 to execute, or not execute, the relinquish exclusivity instruction 515. A condition can be evaluated to selectively change the exclusivity mode of the task in ordering scope.

Figure 7:
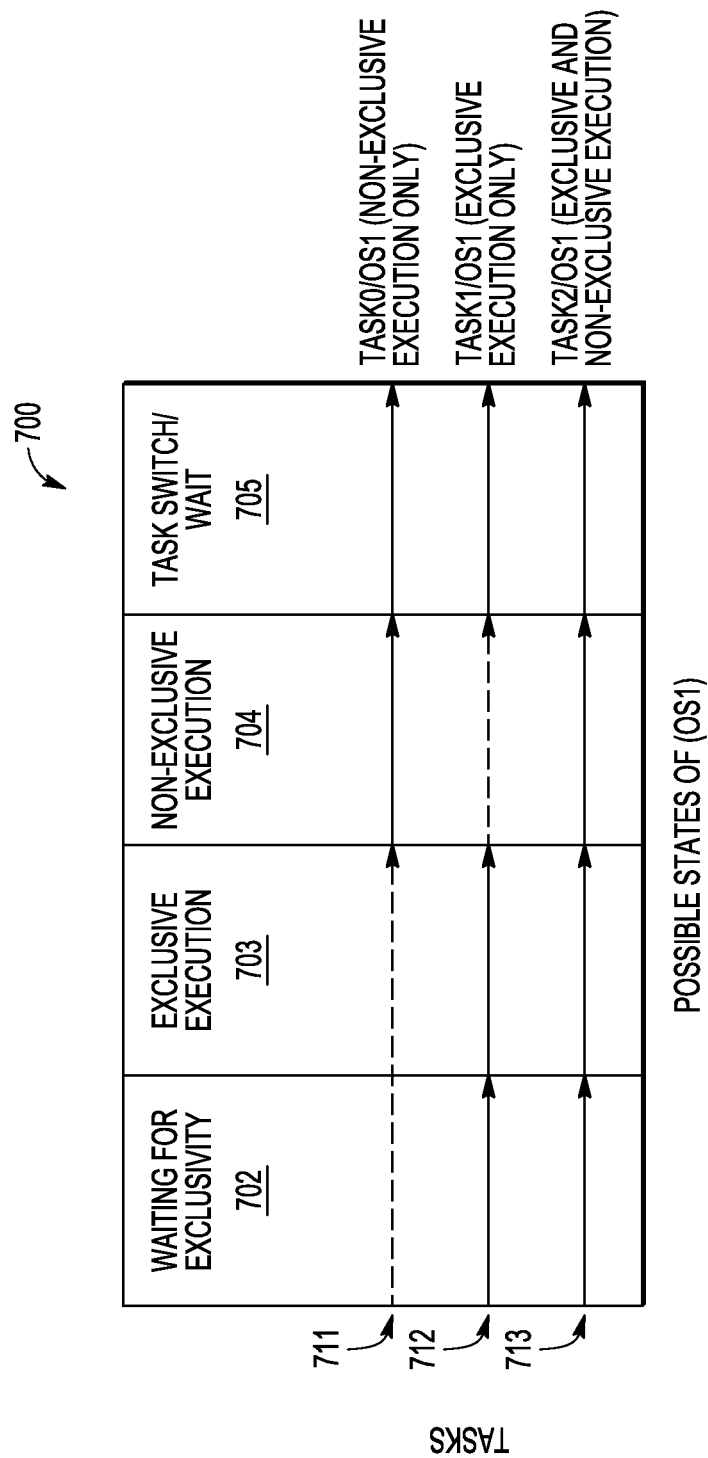
FIG. 7 illustrates different possible states of an ordering scope within the data processing system 100 of FIG. 1 according to a particular embodiment of the disclosure.

Thus, during the time a task executes in a particular ordering scope, the task can have one of three (3) operational states: exclusive only, non-exclusive only, or exclusive—non-exclusive. A task switch instruction, however, can only request that task begin execution in one of two (2) exclusivity modes (e.g., exclusive or non-exclusive) during a next-in-order ordering scope for that task. For example, FIG. 7 illustrates the possible operational states of three tasks 711-713 executing the same ordering scope OS1. At any given time, each task can be one of waiting to operate exclusively (region 702), exclusively operating (region 703), non-exclusively operating (region 704) or waiting to exit its current ordering scope (region 705). Only tasks to be exclusively executed ever wait for exclusivity 702. Therefore, task 711, which is a non-exclusively executed task, is represented by a dashed line at region 702 to indicate that it never waits for exclusivity. However, tasks 712 and 713, which start as exclusively executed tasks, are represented by solid lines at region 702 to indicate that they can wait for exclusivity. For example, tasks 712 and 713 can wait at region 702 until the processor core assigned to exclusive execute tasks 712 and 713 receives a release for the task from an ordering scope manager as discussed above.

A task having a solid line at region 703 exclusively executes in OS1. Therefore, task 711 is represented by a dashed line at state 703 to indicate that task 711 never exclusively executes in OS1. However, tasks 712 and 713 are represented by solid lines at state 703 to indicate that these tasks do exclusively execute in OS1. For example, tasks 712 and 713 can be exclusively executed in OS1 in response to the processor core assigned tasks 712 or 713 receiving the release from the ordering scope manager.

A task having a solid line at region 704 non-exclusively executes in OS1. Therefore, task 712 is represented by a dashed line at region 704 to indicate that task 712 never non-exclusively executes in OS1. However, tasks 711 and 713 are represented by solid lines at state 704 to indicate that these tasks do non-exclusively execute in OS1. For example, task 711 can begin non-exclusively executing in OS1 (region 704) after the processor core assigned task 711 receives the release from the ordering scope manager. Task 713 can non-exclusively execute OS1 (region 704) after exclusively executing in OS1 (region 703) as will be discuss in more detail below.

Region 705 indicates that each task needs to wait for permission to transition out of ordering scope OS1. Therefore, tasks 711, 712, and 713 are all represented by solid lines at state 705 to indicate that all of these tasks need this permission.

Figure 8:
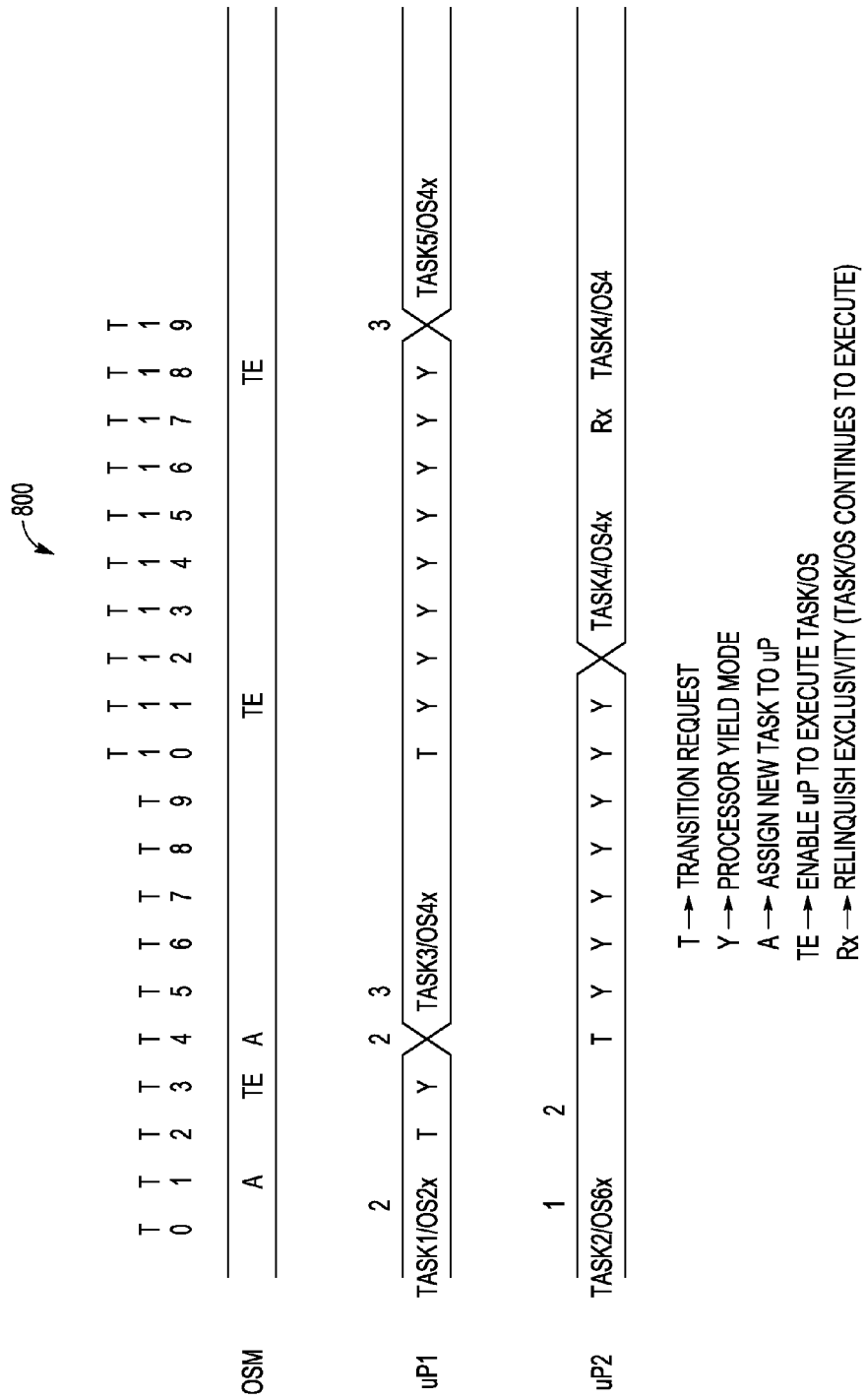
FIG. 8 illustrates a timing diagram for signals associated with processor cores and an ordering scope manager of the data processing system of FIG. 1 in accordance with at least one embodiment of the present disclosure.

FIG. 8 illustrates a timing diagram 800 from time T0 through T19 in accordance with a specific embodiment of a system that relinquishes exclusivity from within a particular ordering scope without an intervening task switch instruction. In particular, FIG. 8 illustrates signals labeled OSM, uP1, and uP2 that correspond to activities/states of the ordering scope manager 116, processor 118, and processor 119, respectively. The timing diagram 800 is better understood with reference to Table 26, which includes entries corresponding to times T0-T19 of the timing diagram 800 of FIG. 8 as will be discussed below.

TABLE 26

| Time | uP1 Task State | uP1 Task Info | uP2 Task State | uP2 Task Info | OSM Comment Info |
|---|---|---|---|---|---|
| T0 | Task1/OS2x | R_Task1<--PGM1[OS1x,,OS2x,OS3x]; I_T3<-- PGM3[OS4x,OS5]; | Task2/0S6x | R_Task2<--PGM2[OS6x,OS7x]; | |
| T1 | | | | | Assign Task4 to uP2 |

TABLE 26-continued

| | uP1 | | uP2 | | OSM Comment |
|---|---|---|---|---|---|
| Time | Task State | Task Info | Task State | Task Info | Info |
| T2 | S | I_Task1<--PGM1[~~OS1x~~,OS2x,OS3x];<br>I_Task3<--PGM1[OS4x,OS5];<br>TRANS(Task1/OS3x); | | R_Task2<--PGM2[OS6x,OS7x];<br>I_Task4<--PGM3[OS4x,OS5]; | |
| T3 | Y | uP1 in Yield Mode; | | | EN(Task3) |
| T4 | Task3/OS4x | I_Task1<--PGM1[~~Os1x, Os2x~~,OS3x];<br>R_Task3<--PGM3[OS4x,OS5]; | S | I_Task2<--PGM2[OS6x,OS7x];<br>I_Task4<--PGM3[OS4x,OS5];<br>TRANS(Task2/OS7x); | Assign Task5 to uP1 |
| T5 | | I_Task1<--PGM1[OS1x,OS2x,OS3x];<br>R_Task3<-- PGM3[OS4x,OS5];<br>I_Task5<--PGM3[OS4x,OS5]; | Y | uP in Yield Mode; | |
| T10 | S | I_Task1<--PGM1[~~Os1x, Os2x~~,OS3x];<br>I_Task3<-- PGM3[OS4x,OS5x];<br>I_Task5<--PGM3[OS4x,OS5x];<br>TRANS(Task3/OS5x); | Y | | |
| T11 | Y | uP in Yield Mode; | Y | | EN(Task4) |
| T12 | Y | | Task4/OS4x | I_Task2<--PGM2[~~OS6x~~,OS7x];<br>R_Task4<--PGM3[OS4x,OS5]; | |
| T17 | Y | | RX | I_Task2<--PGM2[~~OS6x~~,OS7x];<br>R_Task4<--PGM3[OS4x,OS5];<br>REQx(Task4/OS4x) | |
| T18 | Y | | | I_Task2<--PGM2[~~OS6x~~,OS7x];<br>R_Task4<--PGM3[~~OS4x~~,OS4,OS5]; | OS4x-->OS4;<br>EN(Task5) |
| T19 | Task5/OS4x | I_Task1<--PGM1[OS1x,OS2x,OS3x];<br>I_Task3<--PGM3[~~OS4x~~,OS5x];<br>R_Task5<--PGM3[OS4x,OS5]; | | | |

For ease of reference, processor 118 can be referred to as "uP1", processor 119 can be referred to as "uP2", and the ordering scope manager 116 can be referred to as "OSM". In Table 26, fields of the sub-columns labeled "Task State" can indicate whether their corresponding processor, uP1 or uP2, is executing a task, implementing a task switch, or is in a Yield Mode at the corresponding times. Each Task State field can include a term of the form "Taskn/OSmx" that indicates a task currently being executed by its corresponding processor. The mnemonic portion "Taskn" of the term identifies a specific task that is currently executing in a processor, wherein "n" is an integer unique to the specific task. The mnemonic portion "OSmx" identifies the ordering scope that Taskn is operating in, wherein "m" is an integer identifying a specific ordering scope. When present, the suffix "x" of the mnemonic "OSmx" indicates its corresponding task is exclusively executing in the ordering scope OSm. Conversely, when the suffix "x" is omitted its corresponding task is non-exclusively executing in ordering scope OSm. Thus, the Task State term "Task1/OS2x" at entry T0 uP1 indicates that at time T0 Task1 is exclusively executing in ordering scope OS2 at uP1. Until indicated otherwise by another Task State term for uP1, it is presumed that uP1 continues executing in this state.

The fields of the sub-column labeled "Task Info" can include information that indicates: tasks assigned to their corresponding processor; actions being taken by their corresponding processor; and next ordering scopes to be executed by their corresponding processor. Tasks assigned to a processor are indicated at a Task Info field using a term of the form "R|I_Taskn←PGMi[OSm1x,OSm2x,OSm3x]". The mnemonic portion "Taskn" identifies a task that is assigned to the corresponding processor. The term portion "R|I" indicates that one of "R" or "I" will be selected for each term, wherein the mnemonic "R" is selected to indicate that the ordering scope manager 116 has released/enabled Taskn for execution by the processor; and the mnemonic "I" is selected to indicate that Taskn has been assigned to the processor but is inhibited from execution.

The mnemonic "PGMi" of the term "R|I_Taskn→PGMi [OSm1x,OSm2x,OSm3x]" identifies a specific program assigned to Taskn, wherein "i" is an integer. The term portion "[OSm1x,OSm2x,OSm3x]" identifies the ordering scopes that the program PGMi is divided into, wherein "m1", "m2", and "m3" are integers identifying different ordering scopes, and the inclusion or exclusion of the mnemonic "x" as a suffix indicates the task is exclusively or non-exclusively executed with respect to the indicated ordering scope. The order of the listed ordering scopes indicates the sequential order of the ordering scopes within the program. The strikethrough mnemonic (e.g., " ") indicates that execution of the identified ordering scope has been completed. Thus, the Task Info field term "R_Task1←PGM1[,OS2x,OS3x]" at entry T0 of uP1 indicates that at time T0 the ordering scope manager 116 has released Task1 for execution by the processor 118, that the processor 118 will execute an instantiation of program PGM1. Furthermore, the term indicates that PGM1 is partitioned into three ordering scopes (OS1, OS2, OS3) that are executed in the sequence listed, and that Task1 is to exclusively execute in each of the three ordering scopes. Lastly, the term indicates that execution of ordering scope OS1 has already been completed.

Terms of the form "TRANS(Taskn/OSmx)" as used in the fields of the column "Task Info" indicate that the processor core has requested to transition from its current task and ordering scope, to execute Taskn/OSm. The mnemonic "Taskn" identifies the task, the mnemonic "OSm" identifies the ordering scope that Taskn is to operate in, and the inclusion or exclusion of the mnemonic "x" as a suffix indicates the task is to be exclusively or non-exclusively executed with respect to the indicated ordering scope as described above. Thus, the term "TRANS(Task1/OS3x)" at entry T2 of the Task Info column of uP1 indicates that at time T2 the processor 118 has requested to transition to exclusively execute Task1 in ordering scope OS3.

Terms of the form "REQx(Taskn/OSmx)" as used in the Task Info column indicate that exclusivity of a task in an ordering scope is being relinquishing exclusivity of an ordering scope. The mnemonic portion "Taskn" identifies the task that is currently exclusively executing in the ordering scope. Thus, the term "REQx(Task4/OS4x)" at entry T17 of the Task Info column of uP2 indicates that at time T17 uP2 is relinquishing exclusive execution of Task4 in ordering scope OS4.

These terms will now be used in describing operations performed at uP1, at uP2, and at the OSM while the processors execute different tasks during a time period from time T0 to T19. At time T0, two tasks have been assigned to uP1, Task1 and Task3, and one task has been assigned to uP2, Task2. uP1 is exclusively executing Task1 in ordering scope OS2 as indicated by the term Task1/OS2x. Task3 is inhibited in uP1 as indicated by the term "I_Task3←PGM3 [OS4x,OS5]". uP2 is exclusively executing Task2 in ordering scope OS6 as indicated by the term Task2/OS6x, which is the initial ordering scope of Task2, as indicated by the order of the ordering scope mnemonics in the Task Info column.

Referring to time T0 of FIG. 8, the timing signal corresponding to uP1 includes the term Task1/OS2x to indicate that uP1 is exclusively executing Task1 in ordering scope OS2 as described above, and a value of two (2) immediately above the timing signal for uP1 at time T0 indicates that there are two tasks assigned to uP1. The timing signal corresponding to uP2 incudes the term Task2/OS6x to indicate that uP2 is exclusively executing Task2 in ordering scope OS6 as described above, and a value of one (1) immediately above the timing signal for uP2 at time T0 indicates that there is one task assigned to uP2. The timing signal corresponding OSM does not affect operation as it relates to the present example, and therefore has no special indicators shown.

At time T1 of the timing diagram 800 of FIG. 8, the designator "A" indicates that a new task has been assigned to a processor. Referring to entry T1 of Table 26, it is further indicated at the field of the column labeled "OSM Comment Info" that Task4 has been assigned to uP2. As a result, at time T2, a term "I_Task4←PGM3[OS4x,OS5]" has been added to the field of the Task Info column of uP2 to indicate that Task4 has been assigned to uP2 but is inhibited from execution, and to indicate that Task4 will execute exclusively in ordering scope OS4 and non-exclusively in ordering scope OS5. Also at time T2, uP2 is still exclusively executing Task2 in ordering scope OS6 as indicated by the term Task2/OS6x of entry T0 not being replaced by another term at a subsequent time in the Task State column of uP2, and as further indicated by the term "R_Task2←PGM2 [OS6x,OS7x]" in the Task Info column.

Also at time T2, Task1 and Task3 are still the only two tasks assigned to uP1, and Task3 is still inhibited in uP1 as indicated by the term "I_Task3←PGM3[OS4x,OS5]" and uP1 has completed execution of Task1 in ordering OS2 but cannot transition from Task1 ordering scope OS2 until its receives permission from the OSM. After uP1 completes the execution of Task1 in OS2, uP1 can inhibit Task1 as indicated by the term "I_Task1←PGM1[OS2x, OS3x]". uP1 then sends, to the OSM, a transition request to transition to exclusive execution of Task1 in ordering scope OS3, as indicated by the term TRANS(Task1/OS3x) in the Task Info column.

In an embodiment, the OSM can divide the transition request received from uP1 into three different steps or operations: transition-accept; transition-out; and transition-enter. Upon the OSM receiving the transition request TRANS(Task1/OS3x), the OSM can first perform the transition-accept step by negating the Exclusivity field associated with Task1 in the task table 122 to relinquish exclusivity for Task1 in ordering scope OS2. The transition-accept operation can be performed even if the task cannot transition out of the current ordering scope, OS2, because the task is not first-in-transition order for current ordering scope (e.g., the Transition Position field for Task1 is not zero (0)). After the OSM relinquishes exclusivity of Task1, the OSM can then determine whether another task is waiting to exclusively execute in ordering scope OS2. If so, the OSM can authorize the processor core assigned that task to exclusively execute the task in ordering scope OS2. Thus, the transition-accept step can enable another processor core in the data processing system 100 to be enabled to exclusively execute in ordering scope OS2 before Task1 has transitioned out of OS2.

The OSM can then perform the transition-out step by determining whether Task1 can transition out of the current ordering scope OS2. The OSM can make this determination based on the Transition Position field for Task1 as described above. For example, if the Transition Position field for Task1 is zero (0), the OSM can provide uP1 with a transition out signal indicating the task and ordering scope (i.e., Task1/OS2). uP1 can then transition Task1 out of ordering scope OS2 in response to receiving the transition out signal from the OSM. In an embodiment, the OSM can broadcast the transition out signal to all of the processor cores in the data processing system 100 so that each processor core can have knowledge that uP1 is no longer executing in ordering scope OS2.

The OSM can then perform the transition-release step by determining whether uP1 can be enabled to execute in the requested task and ordering scope (i.e., Task1/OS3x). There can be multiple factors that can affect whether Task1/OS3x is released by the OSM for execution in uP1. For example, another processor core could be currently exclusively executing in ordering scope OS3, such that uP1 is blocked from also exclusively executing Task1 in ordering scope OS3. In this situation, the OSM will not provide a release signal to uP1, and as a result uP1 can enter into a Yield Mode based on each of its assigned tasks being inhibited.

Therefore, at time T2 in FIG. 8, the timing signal corresponding to uP1 includes designator "T" which indicates that uP1 sends a transition request for authorization to transition Task1 from ordering scope OS2 to ordering scope OS3. At the same point in time, the timing signal corresponding to uP2 still includes the term Task2/OS6x to indicate that uP2 is exclusively executing Task2 in ordering scope OS6 as described above, and a value of two (2) immediately above the timing signal for uP2 indicates that there are two tasks assigned to uP2. The timing signal corresponding to OSM is not affecting operation as it relates to the present time, and therefore has no special indicators shown.

At time T3 of the timing diagram 800 of FIG. 8, the designator "Y" in the timing signal for uP1 indicates that uP1 is in a Yield Mode based on Task1 being completed (thereby inhibited) as well as all of the other tasks assigned to uP1 being inhibited. Additionally, the designator "TE" indicates that the OSM has enabled/released a task to be executed by a processor and that the OSM has provided authorization to a processor to enter and execute the task.

For example, the OSM may determine that no other processor is exclusively executing a task in ordering scope OS4, so that uP1 can be released to exclusively execute Task3 in ordering scope OS4. Thus, the OSM can release exclusive execution of Task3 in ordering scope OS4.

Referring to entry T3 Table 26, the designator "Y" indicates, at the Task Info column, that uP1 is in Yield Mode, and it is further indicated at the OSM Comment column that Task3 has been enabled/released. As a result of Task3 being enabled, the term "R_Task3←PGM3[OS4x,OS5]" at time T4 indicates in the Task Info column of uP1 that Task3 has been enabled/released for execution in uP1. A term "I_Task1→PGM1[OS3x]" has also been updated in the Task Info field of uP1 to indicate that Task1 is inhibited from execution and that ordering scope OS2 has been completed in Task1, as shown by the mnemonic OS2x being struck through in the Task Info column. At time T4, uP2 has inhibited Task2 in ordering scope OS6 and has sent a request to transition from executing Task2 in ordering scope OS6 to exclusively executing Task2 in ordering scope OS7 as indicated by the term "TRANS(Task2/OS7x)" in the Task Info column. The OSM can receive the transition request from uP2 and perform the three transition steps (i.e., transition-accept, transition-out, and transition-enter) in response to the transition request as discussed above. In this situation, the OSM can determine that uP2 can transition Task2 out of ordering scope OS6, but that uP2 cannot transition to exclusively execute Task2 in ordering scope OS7. At time T4, a new task (e.g., Task5) has been assigned to uP1 as indicated in the Comment Info column of the OSM.

At time T4 of the timing diagram 800 of FIG. 8, designator "A" in the timing signal of OSM indicates that new task (Task5) has been assigned to uP1 or uP2 by the work scheduler 114. Designator "T" in the timing signal for uP2 indicates that uP2 has sent a transition request, and the timing signal for uP1 indicates that, at time T4, uP1 transitions from the Yield Mode to exclusively executing Task3 in ordering scope OS4. Additionally, the value two (2) above the timing signal for uP1 indicates that there are two tasks assigned to uP1 at time T4.

At time T5 of the timing diagram 800 of FIG. 8, the term Task3/OS4x in the timing signal of uP1 indicates that uP1 is currently exclusively executing Task3 in ordering scope OS4. Also at time T5, the value three (3) above the timing signal for uP1 indicates that there are three tasks assigned to uP1. The designator "Y" in timing signal for uP2 indicates that uP2 is Yield Mode. The timing signal corresponding to OSM is not affecting operation as it relates to the present point in time, and therefore has no special indicators shown. Referring to entry T5 of Table 26, a field in the Task Info column of uP1 includes the term "R_Task3←PGM3[OS4x, OS5]", which indicates that Task3 is still enabled/released for execution in uP1, and the term "I_Task1←PGM1 [OS3x]" indicates that Task1 is still inhibited from execution and that ordering scopes OS1 and OS2 have been completed in Task1. Also, at time T5, the term "I_Task5←PGM3 [OS4x,OS5]" is added in the Task Info column of uP1 to indicate that Task5 is assigned to uP1 but is inhibited from execution. At this point, uP2 is still in Yield Mode as indicated by the designator "Y" in field of the Task Info column of uP2. As shown in the timing diagram 800 of FIG. 8, the states of the OSM, uP1, and uP2 do not change from time T6 to time T9. Thus, the entries T6 through T9 are omitted in Table 26 for clarity.

At time T10, Task1, Task3, and Task5 are still assigned to uP1. At this point, uP1 has completed the exclusive execution of Task3 in ordering scope OS4, has inhibited Task3, and has sent a transition request for Task3 as indicated by the term TRANS(Task3/OS5x) in the Task Info column. Additionally, Task1 and Task5 are still inhibited in uP1 as indicated by the terms "I_Task1<--PGM1[OS3x]" and "I_Task5<--PGM3[OS4x,OS5]". As stated above, there can be multiple factors that can effect the next task that is released for execution in uP1. However, at this point, the OSM does not release any task for execution in uP1 based on one or more of the factors described above, such that all tasks assigned to uP1 are inhibited. At time T10, uP2 is in Yield Mode as indicated by designator "Y" in the field of the Task State column of uP2. At time T10 in the timing diagram 800 of FIG. 8, designator "T" in timing signal of uP1 indicates that uP1 has sent a transition request to transition out of its current task and ordering scope (e.g., Task3 in ordering scope OS4) and into a new task and ordering scope. The designator "Y" in the timing signal of uP2 indicates that uP2 is still in Yield Mode.

At time T11 in the timing diagram 800, the timing signals for both uP1 and uP2 include the designator "Y" indicating that they both are in Yield Mode. The timing signal for the OSM includes the designator "TE" to indicate that the OSM has enabled/released a task for execution in either uP1 or uP2. Referring now to T11 in the Table 26, the Task State and Task Info columns of uP1 and uP1 indicate that both processors are in Yield Mode. The term "EN(Task4)" in the Comment Info column of OSM indicates that the OSM has enabled/released Task4 for execution. At time T12 in the Table 26, uP2 is exclusively executing Task4 in ordering scope OS4 as indicated by the term Task4/OS4x. Task2 is inhibited in uP2 and has previously completed ordering scope OS6 as indicated by the term "I_Task2→PGM2 [OS7x]".

uP1 continues to be in Yield Mode from time T13 through time T18 as shown by the designator "Y" repeating in the timing signal for uP1 in the timing diagram 800 of FIG. 8 and the Task State column for uP1 in Table 26. uP2 continues to exclusively execute Task4 in ordering scope OS4 from time T13 through time T16 as shown in timing signal for uP2 in the timing diagram of FIG. 8. At time T17, the timing signal for uP2 includes the designator "Rx" that indicates that uP2 is relinquishing exclusivity of a task in a particular ordering scope. The Task State column of uP2, at time T17, includes the mnemonic "Rx" indicating a relinquish indicator is sent to the OSM, and the term "REQx (Task4/OS4x)" in the Task Info column of uP2 indicates that uP2 is relinquishing exclusivity of Task4 in OS4 during the execution of Task4 in ordering scope OS4. The Task Info column of uP2 also includes the term "I_Task2←PGM2 [OS7x]" indicating that Task2 is inhibited in uP2, the term "R_Task4→PGM3[OS4x,OS5]" in the Task Info column indicates that uP2 is executing Task4 in ordering scope OS4. When uP2 relinquishes exclusivity for Task4/OS4, uP2 continues to non-exclusively execute Task4 in ordering scope OS4 without an intervening task switch instruction.

For example, at time T18 in Table 26, uP2 has relinquished exclusivity of Task4 in ordering scope OS4 and currently is non-exclusively executing Task4 in ordering scope OS4 as indicated by the term "R_Task4←PGM3 [OS4,OS5]" in the Task Info column of uP2. In the Comment Info column of the OSM, the term "OS4x→OS4" indicates that the OSM has changed in exclusive field associated with Task4 from a one (1) to a zero (0) (i.e., asserted to negated) in the ordering scope table in response to receiving a relinquish indicator from uP2. The OSM can then determine whether another task can exclusively execute in ordering scope OS4, and can thereby determine that Task5 can be released to exclusively execute in ordering scope OS4 as indicated by the term "EN(Task5)", in the Comment Info column of OSM. Similarly, at time T18 of the timing diagram 800 of FIG. 8, the designator "TE" in the timing signal of the OSM indicates that the OSM has enabled/released a task to be executed by a processor. The term "Task4/OS4" in the timing signal of uP2 indicates that the uP2 is non-exclusively executing Task4 in ordering scope OS4.

At time T19 of the timing diagram 800 of FIG. 8, the timing signal for uP1 indicates that the uP1 transitions from the Yield Mode to exclusively executing Task5 in ordering scope OS4. Similarly, in Table 26, the term "R_Task5←PGM3[OS4x,OS5]" indicates that Task5 has been enabled/released for execution in uP1, and the mnemonic "Task5/OS4x" in the Task State column of uP1 indicates that uP1 is exclusively executing Task5 in ordering scope OS4.

Thus, uP1 and uP2 can efficiently execute more tasks in the data processing system 100 in response to uP2 relinquishing exclusivity of a task in an ordering scope (e.g., Task4/OS4) before a task switch instruction for ordering scope OS4 is executed. uP2 can then continue to non-exclusively execute the task in the same ordering scope without completing a task switch instruction and thereby not be in a Yield Mode during the number of clock cycles consumed by the task switch operation. uP1 can begin exclusive execution of Task5 in ordering scope OS4 while uP2 is still non-exclusively executing Task4 in ordering scope OS4.

As discussed above, the processor cores can pass execution of a task to a hardware component (e.g., hardware accelerator 121 of FIG. 1). The hardware accelerator 121 can have better knowledge of when exclusivity of a task can be relinquished based on different operations in the hardware component (e.g., ordering, parallelism, pipelining, and the like). Thus, the hardware accelerator 121 can provide the relinquish indicator directly to the ordering scope manager 116.

Figure 9:
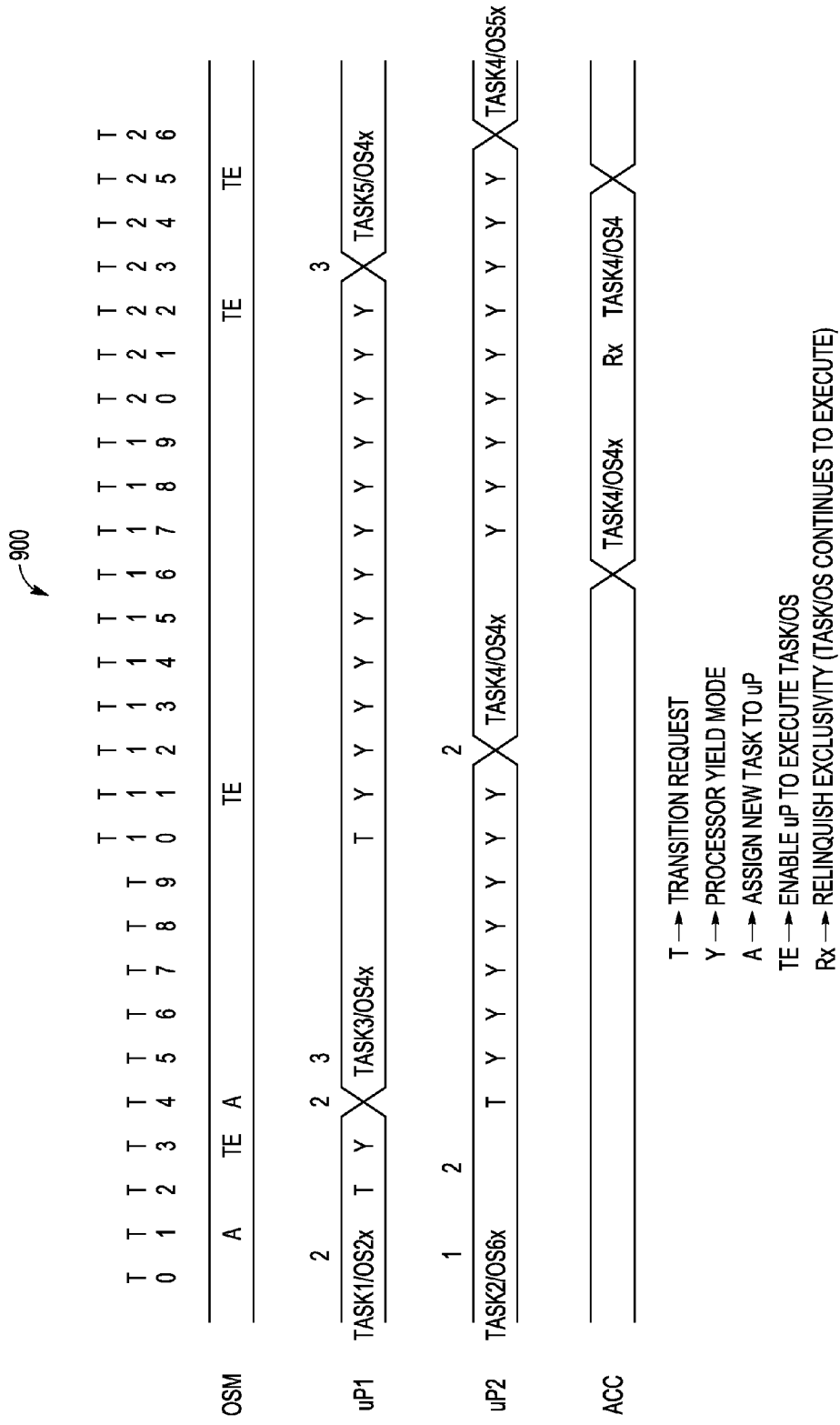
FIG. 9 illustrates a timing diagram for signals associated with the processor cores, the ordering scope manager, and a hardware accelerator of the data processing system of FIG. 1 in accordance with at least one embodiment of the present disclosure.

FIG. 9 illustrates a timing diagram 900 from time T0 through T26 in accordance with a specific embodiment of a system that relinquishes exclusivity from within a particular ordering scope without executing a task switch instruction. In particular, FIG. 9 illustrates signals labeled OSM, uP1, uP2, and ACC that correspond to activities/states of the ordering scope manager 116, processor 118, processor 119, and hardware accelerator 121, respectively. Table 27 includes entries corresponding to times T0-T26 of the timing diagram 900 of FIG. 9 as will be discussed below.

TABLE 27

| | uP1 | | uP2 | | | |
|---|---|---|---|---|---|---|
| Time | Task State | Task Info | Task State | Task Info | ACC | OSM Comment Info |
| T0 | Task1/OS2x | R_Task1<--PGM1[OS1x, OS2x,OS3x];Task2/OS6x I_Task3<-- PGM3[OS4x,OS5]; | | R_Task2<--PGM2[OS6x,OS7x]; | | |
| T1 | | | | | | Assign Task4 to uP2 |
| T2 | S | I_Task1<--PGM1[OS1x,OS2x,OS3x]; I_Task3<--PGM1[OS4x,OS5]; TRANS(Task1/OS3x); | | R_Task2<--PGM2[OS6x,OS7x]; I_Task4<--PGM3[OS4x,OS5x]; | | |
| T3 | Y | uP1 in Yield Mode; | | | | EN(Task3) |
| T4 | Task3/OS4x | I_Task1<--PGM1[OS1x, OS2x, ,OS3x]; S R_Task3<--PGM3[OS4x,OS5x]; | | I_Task2<--PGM2[OS6x,OS7x]; I_Task4<--PGM3[OS4x,OS5x]; TRANS(Task2/OS7x); | | Assign Task5 TO uP1 |
| T5 | | I_Task1<--PGM1[OS1x, OS2x, ,OS3x]; Y R_Task3<-- PGM3[OS4x,OS5]; I_Task5<--PGM3[OS4x,OS5]; | | uP in Yield Mode; | | |
| T10 | S | I_Task1<--PGM1[OS1x, OS2x, ,OS3x]; Y I_Task3<-- PGM3[OS4x,OS5x]; I_Task5<--PGM3[OS4x,OS5x]; TRANS(Task3/OS5x); | | | | |
| T11 | Y | uP in Yield Mode; | Y | | | EN(Task4) |
| T12 | Y | | Task4/OS4x | I_Task2<--PGM2[-OS6x, ,OS7x]; R_Task4<--PGM3[OS4x,OS5x]; | | |
| T15 | Y | | Call(ACC) | I_Task2<--PGM2[-OS6x, ,OS7x]; I_Task4<--PGM3[OS4x,OS5x]; Call to enable ACC & Transition | | |
| T16 | Y | | | uP in Yield Mode; | Task4/OS4x (uP2) | |
| T21 | Y | | | uP in Yield Mode; | REQx(Task4/ OS4) | |
| T22 | Y | | | uP in Yield Mode; | Task4/OS4 (uP2) | OS4x--> OS4; EN(Task5); |
| T23 | Task5/OS4x | I_Task1<--PGM1[OS1x, OS2x, ,OS3x]; I_Task3<--PGM3[-OS4x, ,OS5x]; R_Task5<--PGM3[OS4x,OS5]; | | uP in Yield Mode; | | |
| T24 | | | | uP in Yield Mode; | Return | |
| T25 | | | | uP in Yield Mode; | | EN(Task4) |
| T26 | | | Task4/OS5x | R_Task2<--PGM2[-OS6x, ,OS7x]; I_Task4<--PGM3[-OS4x, ,OS5x]; | | |

For ease of reference, Table 27 includes the same terms, mnemonics, and designators as discussed above with respect to Table 26. The only term found in Table 27 that is not also found in Table 26 is the term "Call(ACC)", which indicates that the hardware accelerator is called, that the execution of a task is passed from a processor core to the hardware accelerator, and that the processor core transitions out of the ordering scope.

For clarity and ease of reference, time T0 through time T14 of the timing diagram 900 of FIG. 9 is substantially similar to time T0 through time T14 of the timing diagram 800 of FIG. 8, and entries T0 through T12 of Table 27 are substantially to entries T0 through T12 of Table 26 as discussed above. uP1, uP2, ACC, and OSM remain in the same state from time T12 to T15. Therefore, the discussion of Table 27 and timing diagram 900 of FIG. 9 will begin at time T15 of Table 27, wherein the term "R_Task4←PGM3 [OS4x,OS5]" indicates that Task4 has been enabled/released for execution in uP2. The term "Call(ACC)" in the Task State column of uP2 indicates that uP2 is passing the exclusive execution of Task4 in ordering scope OS4 to ACC and uP2 transitions from Task4 in ordering scope OS4. However, the transition request is held in a hardware component in communication with the uP2 while the ACC executes Task4 in ordering scope OS4. Thus, after passing the exclusive execution of Task4 in ordering scope OS4 to the ACC, uP2 can inhibit Task4 in its task table, which results in all of the tasks in the task table of uP2 being inhibited.

At time T16 of the timing diagram 900 of FIG. 9, the timing signal for the ACC transitions from not being active (represented by the dashed lines) to exclusively executing Task4 in ordering scope OS4 as indicated by the term "Task4/OS4x" at located in the timing signal ACC at time T17. At entry T17 in Table 27, the term "Task4/OS4x(uP2)" in the ACC column indicates that ACC is exclusively executing Task4 in ordering scope OS4 but that the task is still assigned to uP2 in the ordering scope table of the OSM. As shown in the timing diagram 900 of FIG. 9, ACC continues exclusively executing Task4 in ordering scope OS4 during time T17, T18, T19, and T20, and uP1 and uP2 remain in Yield mode as indicated by the designator "Y". Therefore, for clarity, the entries T17 through T20 have been omitted from Table 27.

At time T21 of the timing diagram 900, the timing signal for ACC includes the designator "Rx" that indicates that the ACC is relinquishing exclusivity with respect to an ordering scope. At entry T21 in Table 27, the term "REQx(Task4/ OS4x)" indicates that the ACC is relinquishing exclusivity of ordering scope OS4. As stated above, the ACC can have the best knowledge of when exclusivity of an ordering scope can be relinquished. Thus, the ability to relinquish exclusivity is provided to the ACC. There can be multiple events that cause the ACC to determine that exclusivity of an ordering scope can be relinquished based on the ACC determining that processing/execution of the ordering scope has reached a point that order will be maintained between ordering scopes if another task begins exclusive execution in the same scope. For example, the ACC can include a first-in-first-out (FIFO) input queue. In this situation, as soon as the instructions of the ordering scope are placed in the FIFO the ACC can relinquish exclusivity of the ordering scope because no later enabled ordering scope can bypass the first ordering scope already stored in the FIFO.

When ACC relinquishes exclusivity for Task4/OS4, ACC continues to non-exclusively execute Task4 in ordering scope OS4 without performing a task switch. At time T22 of the timing diagram 900 of FIG. 9, the timing signal for the ACC includes the term "Task4/OS4" indicating that the ACC is non-exclusively executing Task4 in ordering scope OS4. At time T22 of the timing diagram 900 in FIG. 9, the designator "TE" in the timing signal of the OSM indicates that the OSM has enabled/released a task to be executed by a processor.

Also, at entry T22 of Table 27, the column for the ACC includes the mnemonic "Task4/OS4(uP2)" indicating that the ACC is non-exclusively executing Task4 in the ordering scope OS4 under the control of uP2. The Comment Info column of OSM includes the mnemonic "OS4x→OS4" indicating that the OSM has changed the exclusive field associated with Task4 from a one (1) to a zero (0) (i.e., from asserted to negated) in the ordering scope table to make Task4 be non-exclusive with respect to ordering scope OS4. The term "EN(Task5)" in the Comment Info column of OSM indicates that the OSM has enabled/released Task5 for execution in a processor core.

At time T23 in Table 27, the term "R_Task5←--PGM3 [OS4x,OS5]" indicates that Task5 has been enabled/released for execution in uP1, and the term "Task5/OS4x" in the Task State column of uP1 indicates that uP1 is exclusively executing Task5 in ordering scope OS4. The Task Info column of uP2 indicates that uP2 is currently in a Yield Mode and has been in that state since uP2 called ACC at time T16. At time T23 of the timing diagram 900 in FIG. 9, the timing signal of uP1 illustrates that uP1 transitions from the Yield Mode to exclusively executing Task5 in ordering scope OS4.

At time T24, the timing signal of the ACC illustrates that the ACC has transition from non-exclusively executing Task4 in ordering scope OS4 to an inactive/standby mode (indicated by the dashed lines). Similarly, at entry T24 of the ACC column in Table 27 the term "Return" indicates that the ACC has returned execution of Task4 back to uP2. However, the hardware component in communication with uP2 detects that the execution of Task4 is returned to uP2, and instead of passing the execution back to uP2 the hardware component provides a transition request to the OSM. Upon receiving the transition request, the OSM performs the transition request steps and makes a determination of the next task to be enabled as discussed above. At time T25, the term "EN (Task2)" in the Comment Info column of OSM indicates that the OSM has enabled/released Task4 for execution in a processor core. At time T26, the term "Task2/OS7x" in the Task State column of uP2 indicates that uP2 is exclusively executing in ordering scope OS5, as also indicated by the term "R_Task2←PGM2[OS7x]" in the Task Info column of uP2. Also, at time T26 the Task Info column of uP2 includes the term "I_Task4→PGM3[OS5x]" indicating that Task4 is inhibited in uP2.

As described above, the ACC relinquishing of exclusivity of Task4/OS4 while continuing to non-exclusively execute that Task4/OS4 can increase the efficiency of the data processing system 100 by enabling uP1 to begin exclusive execution of Task5/OS4 without a task switch being completed for Task4/OS4.

In accordance with one aspect of the present disclosure, a method is disclosed. The method includes storing, by an ordering scope manager, a first value in a first storage location, the first value indicating that exclusive execution of a first task in a first ordering scope is enabled. The method also includes that in response to receiving, at the ordering scope manager, a relinquish indicator, storing a second value in the first storage location, the second value indicating that the exclusive execution of the first task in the first ordering scope is disabled.

In one embodiment, the method includes receiving, at the ordering scope manager, a request to exclusively execute a second task in the first ordering scope prior to receiving the relinquish indicator. The method also includes inhibiting the exclusive execution of the second task in the first ordering scope while the first value is stored in the first storage location. The method further includes that in response to storing the second value in the first storage location, storing the first value at a second storage location indicating that exclusive execution of the second task in the first ordering scope is enabled. In one embodiment, non-exclusive execution of the first task in the first ordering scope and the exclusive execution of the second task in the first ordering scope the second task are concurrently enabled.

In one embodiment, the relinquish indicator is provided by a processor core assigned the first task. In one embodiment, the method further includes receiving a release request for the first task in the first ordering scope. The method also includes providing, by the ordering scope manger, a release of the exclusive execution of the first task in the first ordering scope. The method further includes that in response to the release of the exclusive execution of the first task in the first ordering scope being provided, beginning, at a processor core, exclusive execution of the first task in the first ordering scope. The method also includes that passing exclusive execution the first task in the first ordering scope to a hardware accelerator. In one embodiment, the relinquish indicator is received from the hardware accelerator.

In one embodiment, storing the first value in the first storage location is performed concurrently with execution of a task switch instruction in a processor core. In one embodiment, storing the second value in the first storage location is performed concurrently with the non-exclusive execution of the first task in the first ordering scope.

In accordance with one aspect of the present disclosure, a data processing system is disclosed. In one embodiment, the data processing system includes a processor core, the processor core configured to perform tasks on data packets. The data processing system also includes an ordering scope manager configured to communicate with the processor core, the ordering scope manager configured to store a first value in a first storage location, the first value to indicate that exclusive execution of a first task in a first ordering scope is enabled, and in response to a relinquish indicator being received, configured to store a second value in the first storage location, the second value to indicate that the exclusive execution of the first task in the first ordering scope is disabled.

In one embodiment, the ordering scope manager is further configured to receive a request to exclusively execute a second task in the first ordering scope, configured to inhibit the exclusive execution of the second task in the first ordering scope while the first value is stored in the first storage location, and in response to the second value being stored in the first storage location, configured to store the first value in a second storage location to indicate that exclusive execution of the second task in the first ordering scope is enabled. In one embodiment, the processor core is configured to receive an indication that the exclusive execution of the first task in the first ordering scope is enabled, and configured to pass the exclusive execution of the first task in the first ordering scope to a hardware accelerator.

In a further embodiment, the hardware accelerator provides the relinquish indicator to the ordering scope manager.

In one embodiment, the hardware accelerator is a resource external to the processor core. In one embodiment, the processor core provides the relinquish indicator to the ordering scope manager. In a further embodiment, the processor core provides the relinquish indicator in response to an instruction executed by the processor core. In a further embodiment, the first and second storage locations are local to the ordering scope manager.

In accordance with one aspect of the present disclosure, a method is disclosed. The method includes receiving, at a first processor core, a release for exclusive execution of a first task in a first ordering scope. The method also includes storing a first value in a first storage location in response to receiving the release for the exclusive execution of the first task in the first ordering scope. The method further includes exclusively executing, at the first processor core, the first task in the first ordering scope in response to receiving the release for the exclusive execution of the first task in the first ordering scope. The method also includes providing a relinquish indicator to relinquish the exclusive execution of the first task in the first ordering scope. In one embodiment, non-exclusive execution of the first task in the first ordering scope begins without an intervening task switch instruction in response to providing the relinquish indicator.

In one embodiment, the method includes receiving a request to begin exclusive execution of a second task in the first ordering scope. The method also includes inhibiting the exclusive execution of the second task in the first ordering scope while the first value is stored in the first storage location. The method further includes that in response to the relinquish indicator being provided, enabling exclusive execution of the second task in the first ordering scope. In one embodiment, non-exclusive execution of the first task in the first ordering scope and the exclusive execution of the second task in the first ordering scope the second task are concurrently enabled.

In one embodiment, the method includes passing the exclusive execution of the first task in the first ordering scope to a hardware accelerator. In a further embodiment, the relinquish indicator is provided from the hardware accelerator. In one embodiment, the relinquish indicator is provided from the processor core.

Based upon the description herein, it will be appreciated that the preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method comprising:
   storing, by an ordering scope manager, a first value in a first storage location, the first value indicating that exclusive execution of a first task in a first ordering scope is enabled;
   in response to receiving, at the ordering scope manager, a relinquish indicator, storing a second value in the first storage location, the second value indicating that the exclusive execution of the first task in the first ordering scope is disabled;
   receiving, at the ordering scope manager, a request to exclusively execute a second task in the first ordering scope prior to receiving the relinquish indicator;
   inhibiting the exclusive execution of the second task in the first ordering scope while the first value is stored in the first storage location, and
   in response to storing the second value in the first storage location, storing the first value at a second storage location indicating that exclusive execution of the second task in the first ordering scope is enabled, wherein non-exclusive execution of the first task in the first ordering scope and the exclusive execution of the second task in the first ordering scope the second task are concurrently enabled.

2. The method of claim 1, wherein the relinquish indicator is provided by a processor core assigned the first task.

3. The method of claim 1, further comprising:
receiving a release request for the first task in the first ordering scope;
providing, by the ordering scope manger, a release of the exclusive execution of the first task in the first ordering scope;
in response to the release of the exclusive execution of the first task in the first ordering scope being provided, beginning, at a processor core, exclusive execution of the first task in the first ordering scope; and
passing exclusive execution the first task in the first ordering scope to a hardware accelerator.

4. The method of claim 3, wherein the relinquish indicator is received from the hardware accelerator.

5. The method of claim 1, wherein storing the first value in the first storage location is performed concurrently with execution of a task switch instruction in a processor core.

6. The method of claim 1, wherein storing the second value in the first storage location is performed concurrently with the non-exclusive execution of the first task in the first ordering scope.

7. A data processing system comprising:
a processor core, the processor core configured to perform tasks on data packets; and
an ordering scope manager configured to communicate with the processor core, the ordering scope manager configured to store a first value in a first storage location, the first value to indicate that exclusive execution of a first task in a first ordering scope is enabled, and in response to a relinquish indicator being received, configured to store a second value in the first storage location, the second value to indicate that the exclusive execution of the first task in the first ordering scope is disabled, to receive a request to exclusively execute a second task in the first ordering scope, configured to inhibit the exclusive execution of the second task in the first ordering scope while the first value is stored in the first storage location, and in response to the second value being stored in the first storage location, configured to store the first value in a second storage location to indicate that exclusive execution of the second task in the first ordering scope is enabled.

8. The data processing system of claim 7, wherein the processor core is configured to receive an indication that the exclusive execution of the first task in the first ordering scope is enabled, and configured to pass the exclusive execution of the first task in the first ordering scope to a hardware accelerator.

9. The data processing system of claim 8, wherein the hardware accelerator provides the relinquish indicator to the ordering scope manager.

10. The method of claim 8, wherein the hardware accelerator is a resource external to the processor core.

11. The data processing system of claim 7, wherein the processor core provides the relinquish indicator to the ordering scope manager.

12. The data processing system of claim 11, wherein the processor core provides the relinquish indicator in response to an instruction executed by the processor core.

13. The data processing system of claim 12, wherein the first and second storage locations are local to the ordering scope manager.

14. A method comprising:
receiving, at a first processor core, a release for exclusive execution of a first task in a first ordering scope;
storing a first value in a first storage location in response to receiving the release for the exclusive execution of the first task in the first ordering scope;
exclusively executing, at the first processor core, the first task in the first ordering scope in response to receiving the release for the exclusive execution of the first task in the first ordering scope;
providing a relinquish indicator to relinquish the exclusive execution of the first task in the first ordering scope, wherein non-exclusive execution of the first task in the first ordering scope begins without an intervening task switch instruction in response to providing the relinquish indicator;
receiving a request to begin exclusive execution of a second task in the first ordering scope;
inhibiting the exclusive execution of the second task in the first ordering scope while the first value is stored in the first storage location; and
in response to the relinquish indicator being provided, enabling exclusive execution of the second task in the first ordering scope, wherein non-exclusive execution of the first task in the first ordering scope and the exclusive execution of the second task in the first ordering scope the second task are concurrently enabled.

15. The method of claim 14, further comprising:
passing the exclusive execution of the first task in the first ordering scope to a hardware accelerator.

16. The method of claim 15, wherein the relinquish indicator is provided from the hardware accelerator.

17. The method of claim 14, wherein the relinquish indicator is provided from the processor core.

* * * * *